US011556338B2

(12) United States Patent
Anderson et al.

(10) Patent No.: US 11,556,338 B2
(45) Date of Patent: *Jan. 17, 2023

(54) VECTOR SIMD VLIW DATA PATH ARCHITECTURE

(71) Applicant: TEXAS INSTRUMENTS INCORPORATED, Dallas, TX (US)

(72) Inventors: Timothy David Anderson, University Park, TX (US); Duc Quang Bui, Grand Prairie, TX (US); Mujibur Rahman, Plano, TX (US); Joseph Raymond Michael Zbiciak, San Jose, CA (US); Eric Biscondi, Roquefort-les-pin (FR); Peter Dent, Northamptonshire (GB); Jelena Milanovic, Antibes (FR); Ashish Shrivastava, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 95 days.

This patent is subject to a terminal disclaimer.

(21) Appl. No.: 16/852,690

(22) Filed: Apr. 20, 2020

(65) Prior Publication Data

US 2020/0319881 A1 Oct. 8, 2020

Related U.S. Application Data

(63) Continuation of application No. 14/327,084, filed on Jul. 9, 2014, now Pat. No. 10,628,156.

(60) Provisional application No. 61/844,074, filed on Jul. 9, 2013, provisional application No. 61/856,817, filed on Jul. 22, 2013.

(51) Int. Cl.
G06F 9/30 (2018.01)
G06F 9/38 (2018.01)

(52) U.S. Cl.
CPC ........ *G06F 9/30036* (2013.01); *G06F 9/3001* (2013.01); *G06F 9/30018* (2013.01); *G06F 9/30021* (2013.01); *G06F 9/30112* (2013.01); *G06F 9/3893* (2013.01)

(58) Field of Classification Search
CPC .............. G06F 9/30036; G06F 9/3001; G06F 9/30018; G06F 9/30021; G06F 9/30112; G06F 9/3893
See application file for complete search history.

(56) References Cited

U.S. PATENT DOCUMENTS

2003/0074544 A1 4/2003 Wilson
2008/0184211 A1 7/2008 Nickolls et al.
2012/0084539 A1 4/2012 Nyland et al.

OTHER PUBLICATIONS

Kathail et al., "HPL-PD Architecture Specification": Version 1.1; 2 000; HP.

*Primary Examiner* — Corey S Faherty
(74) *Attorney, Agent, or Firm* — Brian D. Graham; Frank D. Cimino

(57) ABSTRACT

A Very Long Instruction Word (VLIW) digital signal processor particularly adapted for single instruction multiple data (SIMD) operation on various operand widths and data sizes. A vector compare instruction compares first and second operands and stores compare bits. A companion vector conditional instruction performs conditional operations based upon the state of a corresponding predicate data register bit. A predicate unit performs data processing operations on data in at least one predicate data register including unary operations and binary operations. The predicate unit may also transfer data between a general data register file and the predicate data register file.

20 Claims, 18 Drawing Sheets

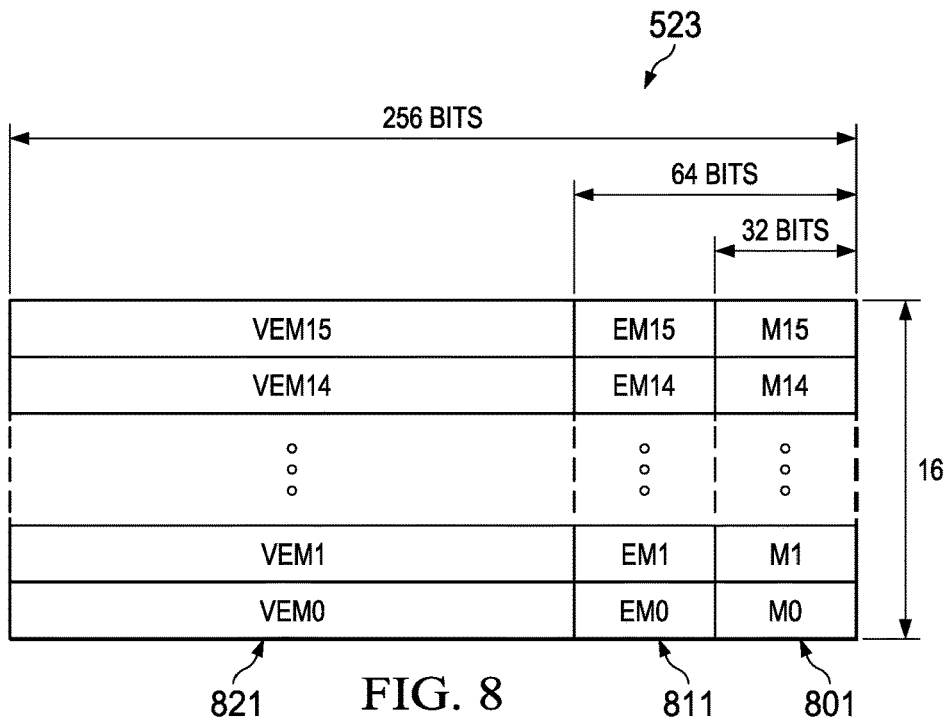
FIG. 8
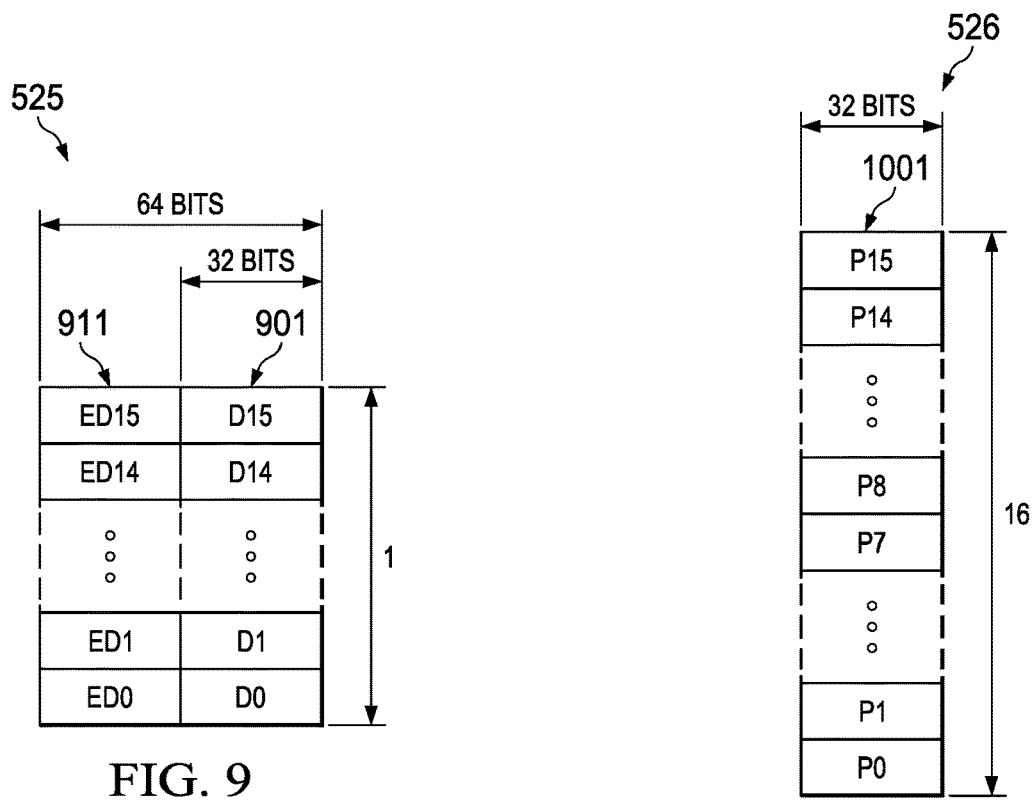
FIG. 9
FIG. 10

FIG. 20

VECTOR SIMD VLIW DATA PATH ARCHITECTURE

CROSS-REFERENCE TO RELATED APPLICATIONS

This application is a continuation of U.S. patent application Ser. No. 14/327,084, filed Jul. 9, 2014, which claims priority under 35 U.S.C. 119(e) (1) to U.S. Provisional Application No. 61/844,074, filed Jul. 9, 2013, and to U.S. Provisional Application No. 61/856,817, filed Jul. 22, 2013, each of which is incorporated by reference herein in its entirety.

TECHNICAL FIELD OF THE INVENTION

The technical field of this invention is digital data processing and more specifically

BACKGROUND OF THE INVENTION

Digital signal processors are very useful in real time data processing operations such as audio/video encoding and decoding. Such digital signal processors are used extensively in cellular wireless base stations where the computation load is extensive.

While digital signal processors excel at filter functions, many applications require varying data sizes. One approach to this problem is single instruction multiple data (SIMD) operation. In SIMD operation the same instruction is applied to plural data portions using wide hardware.

Digital signal processors excel at tight loops which run many times, they are not good at branching algorithms. Therefore there is a need in the art for digital signal processors which provide enhanced conditional operations in SIMD.

SUMMARY OF THE INVENTION

A Very Long Instruction Word (VLIW) digital signal processor particularly adapted for single instruction multiple data (SIMD) operation on various operand widths and data sizes. A vector compare instruction compares first and second operands and stores a compare bit for each specified data size in a predicate register. A companion vector conditional instruction performing a first operation on data if a corresponding bit of a predicate data register has a first digital state and an alternative operation if the has an opposite state. A predicate unit performs data processing operations on data in at least one predicate data register.

The predicate unit may perform unary operations upon individual bits of a single operand. These unary operations include negation of each bit, determining a bit count and determining a bit position of a least significant bit within the predicate data register having an instruction specified first digital state.

The predicate unit may perform binary operations upon two operands. These binary operations include ANDing, ANDing and negating, ORing, ORing and negating, exclusive ORing corresponding bits of the two operands.

The predicate unit may also transfer data between a general data register file and the predicate data register file.

BRIEF DESCRIPTION OF THE DRAWINGS

These and other aspects of this invention are illustrated in the drawings, in which:

FIG. 8 illustrates a local vector register file shared by the multiply and correlation functional units;
FIG. 9 illustrates a local register file of the load/store unit;
FIG. 10 illustrates a predicate register file;
FIG. 20 schematically illustrates the comparisons of the instruction illustrated in FIGS. 19A and 19B.

DETAILED DESCRIPTION OF PREFERRED EMBODIMENTS

Figure 1:
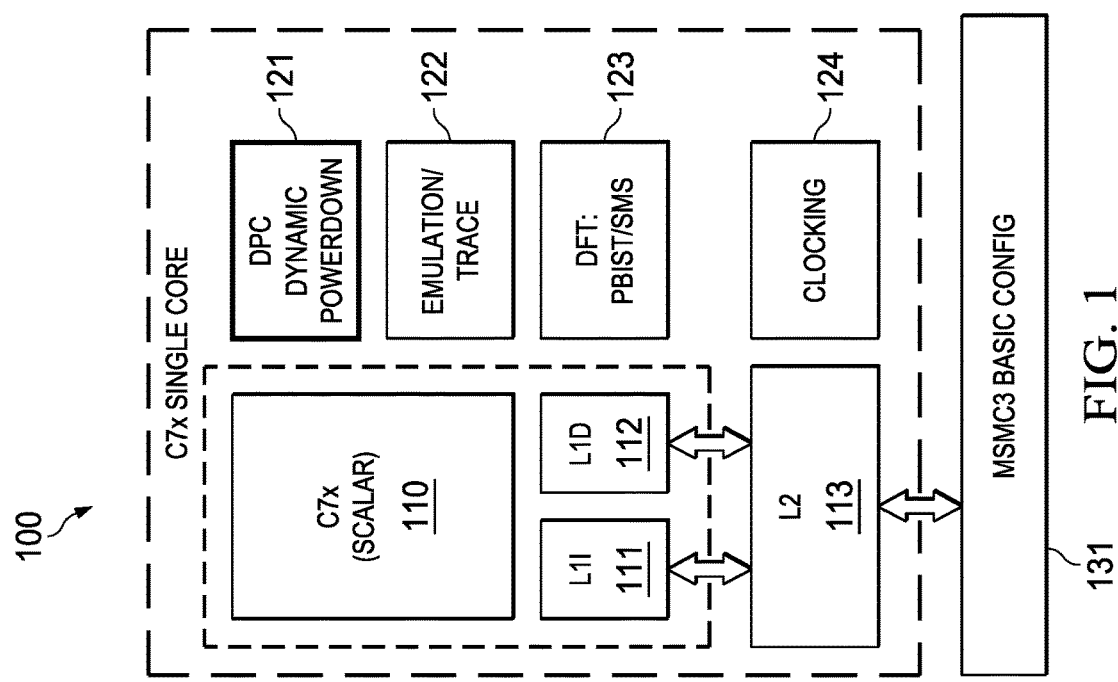
FIG. 1 illustrates a single core scalar processor according to one embodiment of this invention.

FIG. 1 illustrates a single core scalar processor according to one embodiment of this invention. Single core processor 100 includes a scalar central processing unit (CPU) 110 coupled to separate level one instruction cache (L1I) 111 and level one data cache (L2) 112. Central processing unit core 110 could be constructed as known in the art and would typically include a register file, an integer arithmetic logic unit, an integer multiplier and program flow control units. Single core processor 100 includes a level two combined instruction/data cache (L2) 113 that holds both instructions and data. In the preferred embodiment scalar central processing unit (CPU) 110, level one instruction cache (L1I) 111, level one data cache (L2) 112 and level two combined instruction/data cache (L2) 113 are formed on a single integrated circuit.

In a preferred embodiment this single integrated circuit also includes auxiliary circuits such as power control circuit 121, emulation/trace circuits 122, design for test (DST) programmable built-in self test (PBIST) circuit 123 and clocking circuit 124. External to CPU 110 and possibly integrated on single integrated circuit 100 is memory controller 131.

CPU 110 operates under program control to perform data processing operations upon defined data. The program controlling CPU 110 consists of a plurality of instructions that must be fetched before decoding and execution. Single core processor 100 includes a number of cache memories. FIG. 1 illustrates a pair of first level caches. Level one instruction cache (L1I) 111 stores instructions used by CPU 110. CPU 110 first attempts to access any instruction from level one instruction cache 121. Level one data cache (L1D) 112 stores data used by CPU 110. CPU 110 first attempts to access any required data from level one data cache 112. The two level one caches (L1I 111 and L1D 112) are backed by a level two unified cache (L2) 113. In the event of a cache miss to level one instruction cache 111 or to level one data cache 112, the requested instruction or data is sought from level two unified cache 113. If the requested instruction or data is stored in level two unified cache 113, then it is supplied to the requesting level one cache for supply to central processing unit core 110. As is known in the art, the requested instruction or data may be simultaneously supplied to both the requesting cache and CPU 110 to speed use.

Level two unified cache 113 is further coupled to higher level memory systems via memory controller 131. Memory controller 131 handles cache misses in level two unified cache 113 by accessing external memory (not shown in FIG. 1). Memory controller 131 handles all memory centric functions such as cacheabilty determination, error detection and correction, address translation and the like. Single core processor 100 may be a part of a multiprocessor system. In that case memory controller 131 handles data transfer between processors and maintains cache coherence among processors.

Figure 2:
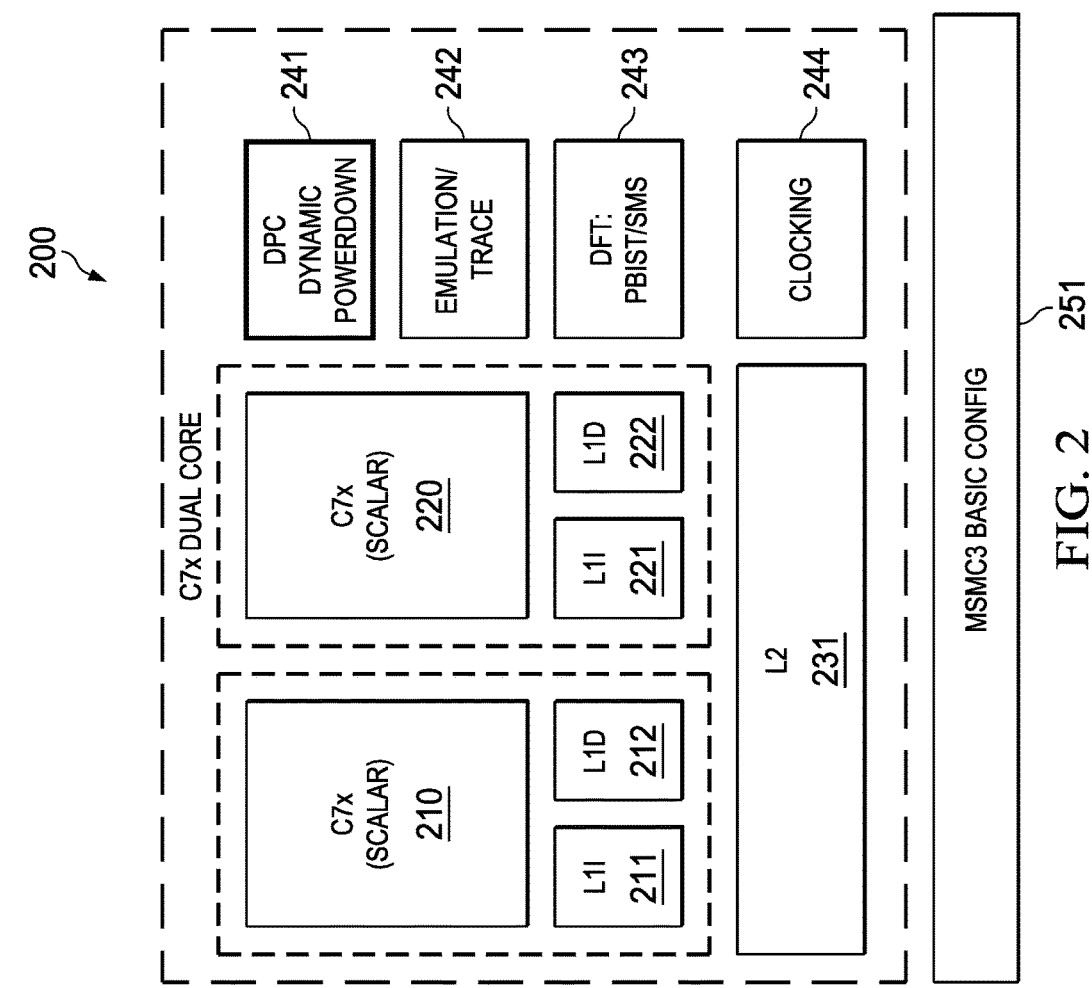
FIG. 2 illustrates a dual core scalar processor according to another embodiment of this invention.

FIG. 2 illustrates a dual core processor according to another embodiment of this invention. Dual core processor 200 includes first CPU 210 coupled to separate level one instruction cache (L1I) 211 and level one data cache (L1D) 212 and second CPU 220 coupled to separate level one instruction cache (L1I) 221 and level one data cache (L1D) 212. Central processing units 210 and 220 are preferably constructed similar to CPU 110 illustrated in FIG. 1. Dual core processor 200 includes a single shared level two combined instruction/data cache (L2) 231 supporting all four level one caches (L1I 211, L1D 212, L1I 221 and L1D 222). In the preferred embodiment CPU 210, level one instruction cache (L1I) 211, level one data cache (L1D) 212, CPU 220, level one instruction cache (L1I) 221, level one data cache (L1D) 222 and level two combined instruction/data cache (L2) 231 are formed on a single integrated circuit. This single integrated circuit preferably also includes auxiliary circuits such as power control circuit 241, emulation/trace circuits 242, design for test (DST) programmable built-in self test (PBIST) circuit 243 and clocking circuit 244. This single integrated circuit may also include memory controller 251.

Figure 3:
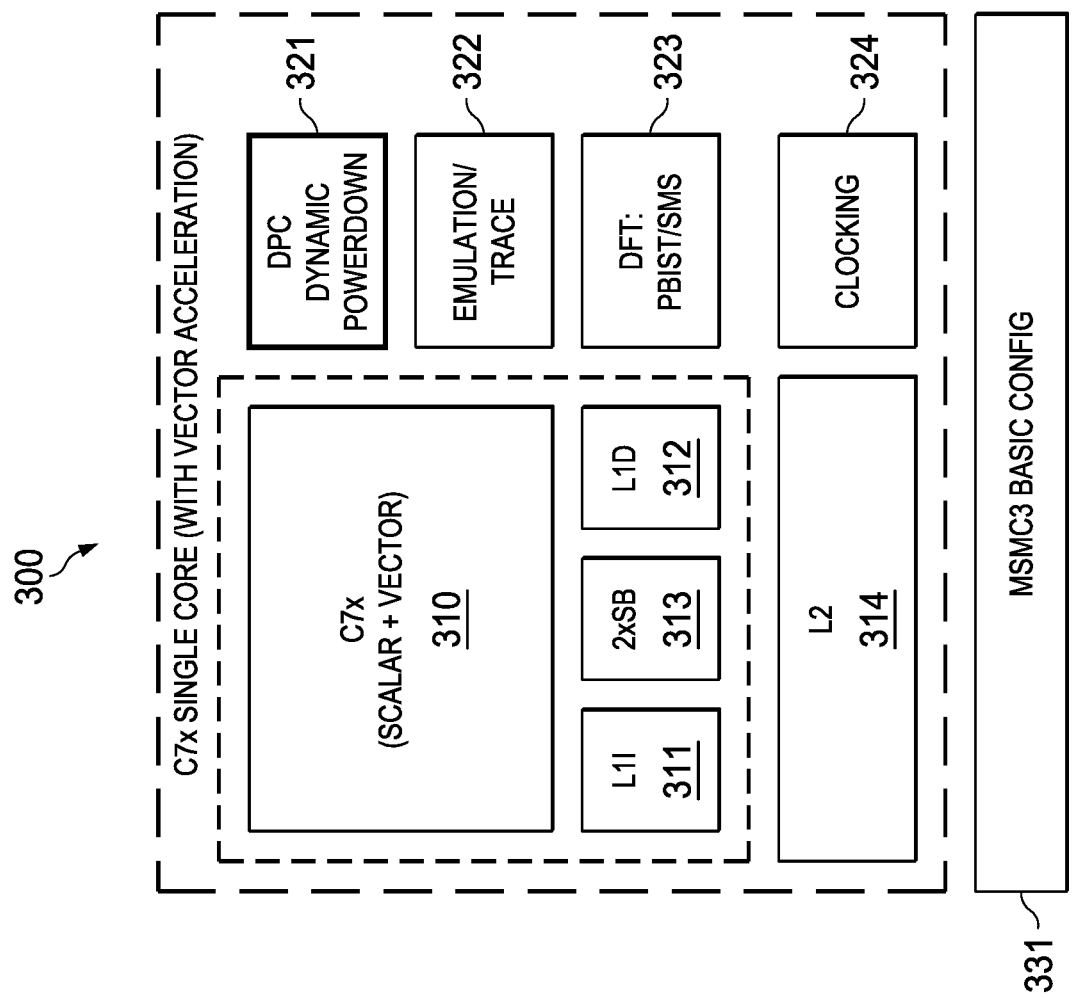
FIG. 3 illustrates a single core vector processor according to a further embodiment of this invention.
Figure 4:
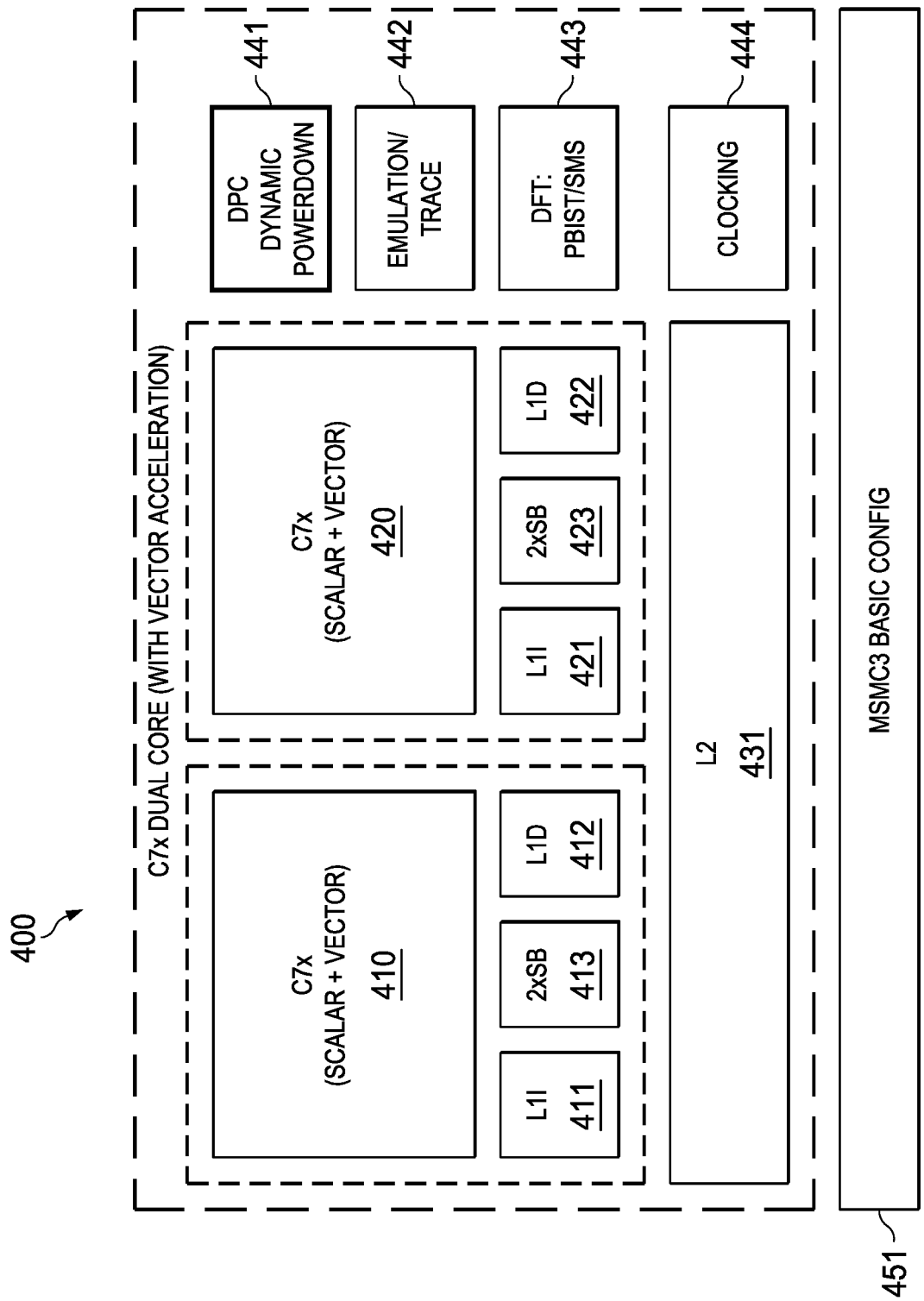
FIG. 4 illustrates a dual core vector processor according to a further embodiment of this invention.

FIGS. 3 and 4 illustrate single core and dual core processors similar to that shown respectively in FIGS. 1 and 2. FIGS. 3 and 4 differ from FIGS. 1 and 2 in showing vector central processing units, as further described below. Single core vector processor 300 includes a vector CPU 310. Dual core vector processor 400 includes two vector CPUs 410 and 420. Vector CPUs 310, 410 and 420 include wider data path operational units and wider data registers than the corresponding scalar CPUs 110, 210 and 220.

Figure 5:
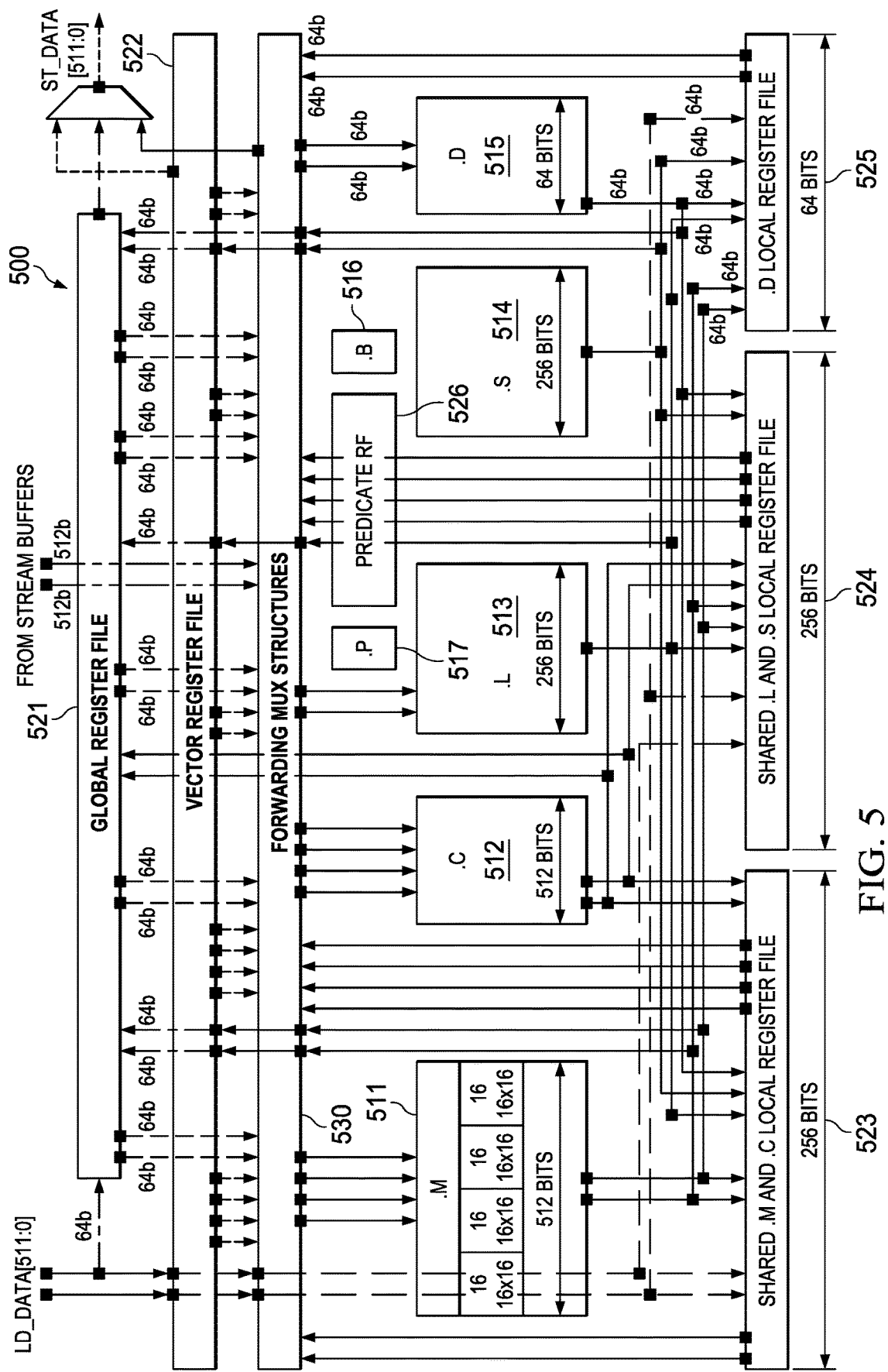
FIG. 5 illustrates construction of one embodiment of the CPU of this invention.

Vector CPUs 310, 410 and 420 further differ from the corresponding scalar CPUs 110, 210 and 220 in the inclusion of streaming engine 313 (FIG. 3) and streaming engines 413 and 423 (FIG. 5). Streaming engines 313, 413 and 423 are similar. Streaming engine 313 transfers data from level two unified cache 313 (L2) to a vector CPU 310. Streaming engine 413 transfers data from level two unified cache 431 to vector CPU 410. Streaming engine 423 transfers data from level two unified cache 431 to vector CPU 420. In accordance with the preferred embodiment each streaming engine 313, 413 and 423 manages up to two data streams.

Each streaming engine 313, 413 and 423 transfer data in certain restricted circumstances. A stream consists of a sequence of elements of a particular type. Programs that operate on streams read the data sequentially, operating on each element in turn. Every stream has the following basic properties. The stream data have a well-defined beginning and ending in time. The stream data have fixed element size and type throughout the stream. The stream data have fixed sequence of elements. Thus programs cannot seek randomly within the stream. The stream data is read-only while active. Programs cannot write to a stream while simultaneously reading from it. Once a stream is opened the streaming engine: calculates the address; fetches the defined data type from level two unified cache; performs data type manipulation such as zero extension, sign extension, data element sorting/swapping such as matrix transposition; and delivers the data directly to the programmed execution unit within the CPU. Streaming engines are thus useful for real-time digital filtering operations on well-behaved data. Streaming engines free these memory fetch tasks from the corresponding CPU enabling other processing functions.

The streaming engines provide the following benefits. They permit multi-dimensional memory accesses. They increase the available bandwidth to the functional units. They minimize the number of cache miss stalls since the stream buffer can bypass L1D cache. They reduce the number of scalar operations required in the loop to maintain. They manage the address pointers. They handle address generation automatically freeing up the address generation instruction slots and the .D unit for other computations.

FIG. 5 illustrates construction of one embodiment of the CPU of this invention. Except where noted in this description, the term CPU covers both scalar CPUs and vector CPUs. The CPU embodiment depicted in FIG. 5 includes the following plural execution units: multiply unit 511 (.M), correlation unit 512 (.C), arithmetic unit 513 (.L), arithmetic unit 514 (.S), load/store unit 515 (.D), branch unit 516 (.B) and predication unit 517 (.P). The operation and relationships of these execution units are detailed below.

Multiply unit 511 primarily preforms multiplications. Multiply unit 511 accepts up to two double vector operands and produces up to one double vector result. Multiply unit 511 is instruction configurable to perform the following operations: various integer multiply operations, with precision ranging from 8-bits to 64-bits; various regular and complex dot product operations; and various floating point multiply operations; bit-wise logical operations; moves; as well as adds and subtracts. As illustrated in FIG. 5 multiply unit 511 includes hardware for four simultaneous 16 bit by 16 bit multiplications. Multiply unit 511 may access global scalar register file 521, global vector register file 522 and shared .M and C. local register 523 file in a manner described below. Forwarding multiplexer 530 mediates the data transfer between global scalar register file 521, global vector register file 522, the corresponding streaming engine and multiply unit 511.

Correlation unit 512 (.C) accepts up to two double vector operands and produces up to one double vector result. Correlation unit 512 supports these major operations. In support of WCDMA "Rake" and "Search" instructions correlation unit 512 performs up to 512 2-bit PN*8-bit I/Q complex multiplies per clock cycle. Correlation unit 512 performs 8-bit and 16-bit Sum-of-Absolute-Difference (SAD) calculations performing up to 512 SADs per clock cycle. Correlation unit 512 performs horizontal add and horizontal min/max instructions. Correlation unit 512 performs vector permutes instructions. Correlation unit 512 includes contains 8 256-bit wide control registers. These control registers are used to control the operations of certain correlation unit instructions. Correlation unit 512 may access global scalar register file 521, global vector register file 522 and shared .M and C. local register file 523 in a manner described below. Forwarding multiplexer 530 mediates the data transfer between global scalar register file 521, global vector register file 522, the corresponding streaming engine and correlation unit 512.

CPU 500 includes two arithmetic units: arithmetic unit 513 (.L) and arithmetic unit 514 (.S). Each arithmetic unit 513 and arithmetic unit 514 accepts up to two vector operands and produces one vector result. The compute units support these major operations. Arithmetic unit 513 and arithmetic unit 514 perform various single-instruction-multiple-data (SIMD) fixed point arithmetic operations with precision ranging from 8-bit to 64-bits. Arithmetic unit 513 and arithmetic unit 514 perform various vector compare and minimum/maximum instructions which write results directly to predicate register file 526 (further described below). These comparisons include A=B, A>B, A≥B, A<B and A≤B. If the comparison is correct, a 1 bit is stored in the corresponding bit position within the predicate register. If the comparison fails, a 0 is stored in the corresponding bit position within the predicate register. Vector compare instructions assume byte (8 bit) data and thus generate 32 single bit results. Arithmetic unit 513 and arithmetic unit 514 perform various vector operations using a designated predicate register as explained below. Arithmetic unit 513 and arithmetic unit 514 perform various SIMD floating point arithmetic operations with precision ranging from half-precision (16-bits), single precision (32-bits) to double precision (64-bits). Arithmetic unit 513 and arithmetic unit 514 perform specialized instructions to speed up various algorithms and functions. Arithmetic unit 513 and arithmetic unit 514 may access global scalar register file 521, global vector register file 522, shared .L and .S local register file 524 and predicate register file 526. Forwarding multiplexer 530 mediates the data transfer between global scalar register file 521, global vector register file 522, the corresponding streaming engine and arithmetic units 513 and 514.

Load/store unit 515 (.D) is primarily used for address calculations. Load/store unit 515 is expanded to accept scalar operands up to 64-bits and produces scalar result up to 64-bits. Load/store unit 515 includes additional hardware to perform data manipulations such as swapping, pack and unpack on the load and store data to reduce workloads on the other units. Load/store unit 515 can send out one load or store request each clock cycle along with the 44-bit physical address to level one data cache (L1D). Load or store data width can be 32-bits, 64-bits, 256-bits or 512-bits. Load/store unit 515 supports these major operations: 64-bit SIMD arithmetic operations; 64-bit bit-wise logical operations; and scalar and vector load and store data manipulations. Load/store unit 515 preferably includes a micro-TLB (table lookaside buffer) block to perform address translation from a 48-bit virtual address to a 44-bit physical address. Load/store unit 515 may access global scalar register file 521, global vector register file 522 and .D local register file 525 in a manner described below. Forwarding multiplexer 530 mediates the data transfer between global scalar register file 521, global vector register file 522, the corresponding streaming engine and load/store unit 515.

Branch unit 516 (.B) calculates branch addresses, performs branch predictions, and alters control flows dependent on the outcome of the prediction.

Predication unit 517 (.P) is a small control unit which performs basic operations on vector predication registers. Predication unit 517 has direct access to the vector predication registers 526. Predication unit 517 performs different bit operations on the predication registers such as AND, ANDN, OR, XOR, NOR, BITR, NEG, SET, BITCNT (bit count), RMBD (right most bit detect), BIT Decimate and Expand, etc.

Figure 6:
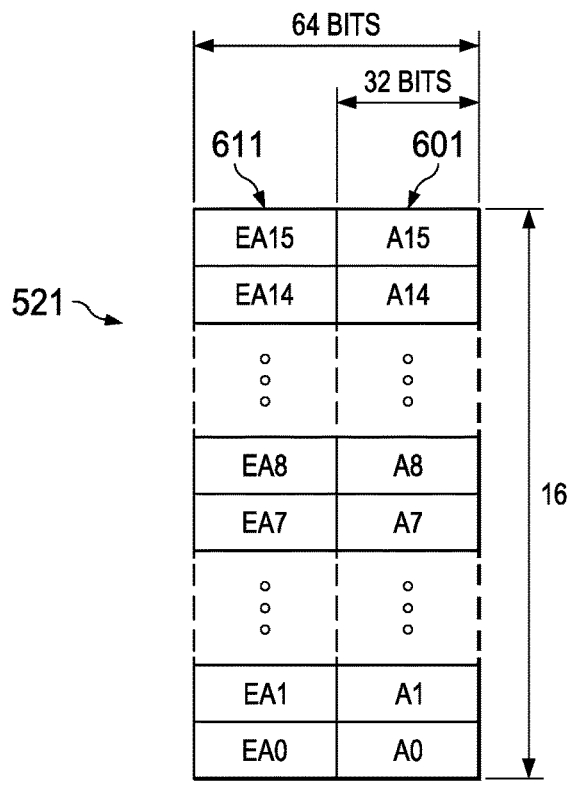
FIG. 6 illustrates a global scalar register file.

FIG. 6 illustrates global scalar register file 521. There are 16 independent 64-bit wide scalar registers. Each register of global scalar register file 521 can be read as 32-bits of scalar data (designated registers A0 to A15 601) or 64-bits of scalar data (designated registers EA0 to EA15 611). However, writes are always 64-bit, zero-extended to fill up to 64-bits if needed. All scalar instructions of all functional units can read from or write to global scalar register file 521. The instruction type determines the data size. Global scalar register file 521 supports data types ranging in size from 8-bits through 64-bits. A vector instruction can also write to the 64-bit global scalar registers 521 with the upper 192-bits of the vector being discarded. A vector instruction can also read 64-bit data from the global scalar register file 511. In this case the operand is zero-extended in the upper 192-bit to form an input vector.

Figure 7:
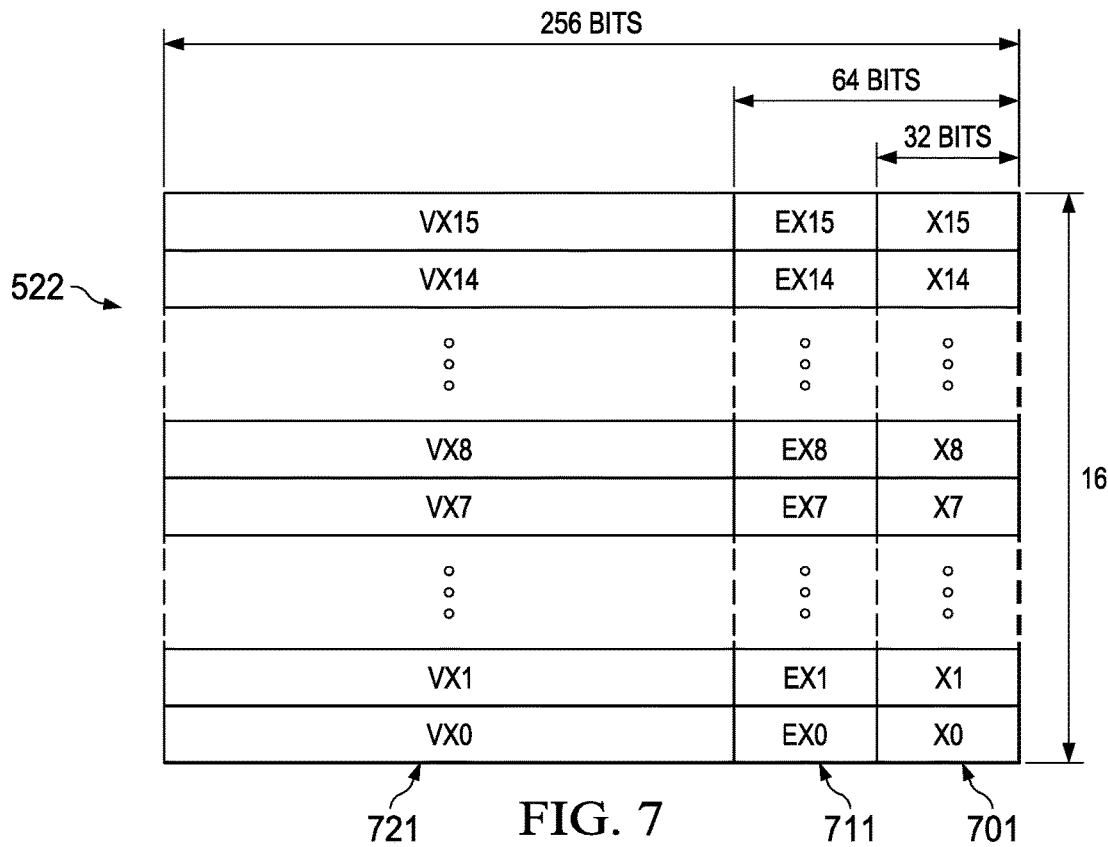
FIG. 7 illustrates a global vector register file.

FIG. 7 illustrates global vector register file 522. There are 16 independent 256-bit wide vector registers. Each register of global vector register file 522 can be read as 32-bits scalar data (designated registers X0 to X15 701), 64-bits of scalar data (designated registers EX0 to EX15 711), 256-bit vector data (designated registers VX0 to VX15 721) or 512-bit double vector data (designated DVX0 to DVX7, not illustrated). In the current embodiment only multiply unit 511 and correlation unit 512 may execute double vector instructions. All vector instructions of all functional units can read or write to global vector register file 522. Any scalar instruction of any functional unit can also access the low 32 or 64 bits of a global vector register file 522 register for read or write. The instruction type determines the data size.

FIG. 8 illustrates local vector register file 523. There are 16 independent 256-bit wide vector registers. Each register of local vector register file 523 can be read as 32-bits scalar data (designated registers M0 to M15 801), 64-bits of scalar data (designated registers EM0 to EM15 811), 256-bit vector data (designated registers VM0 to VM15 821) or 512-bit double vector data (designated DVM0 to DVM7, not illustrated). In the current embodiment only multiply unit 511 and correlation unit 512 may execute double vector instructions. All vector instructions of all functional units can write to local vector register file 523. Only instructions of multiply unit 511 and correlation unit 512 may read from local vector register file 523. The instruction type determines the data size.

Multiply unit 511 may operate upon double vectors (512-bit data). Multiply unit 511 may read double vector data from and write double vector data to global vector register file 521 and local vector register file 523. Register designations DVXx and DVMx are mapped to global vector register file 521 and local vector register file 523 as follows.

TABLE 1

| Instruction Designation | Register Accessed |
|---|---|
| DVX0 | VX1:VX0 |
| DVX1 | VX3:VX2 |
| DVX2 | VX5:VX4 |
| DVX3 | VX7:VX6 |
| DVX4 | VX9:VX8 |
| DVX5 | VX11:VX10 |
| DVX6 | VX13:VX12 |
| DVX7 | VX15:VX14 |
| DVM0 | VM1:VM0 |
| DVM1 | VM3:VM2 |
| DVM2 | VM5:VM4 |
| DVM3 | VM7:VM6 |
| DVM4 | VM9:VM8 |
| DVM5 | VM11:VM10 |
| DVM6 | VM13:VM12 |
| DVM7 | VM15:VM14 |

Each double vector designation maps to a corresponding pair of adjacent vector registers in either global vector register 522 or local vector register 523. Designations DVX0 to DVX7 map to global vector register 522. Designations DVM0 to DVM7 map to local vector register 523.

Local vector register file 524 is similar to local vector register file 523. There are 16 independent 256-bit wide vector registers. Each register of local vector register file 524 can be read as 32-bits scalar data (designated registers L0 to L15 701), 64-bits of scalar data (designated registers EL0 to EL15 711) or 256-bit vector data (designated registers VL0 to VL15 721). All vector instructions of all functional units can write to local vector register file 524. Only instructions of arithmetic unit 513 and arithmetic unit 514 may read from local vector register file 524.

FIG. 9 illustrates local register file 525. There are 16 independent 64-bit wide registers. Each register of local register file 525 can be read as 32-bits scalar data (designated registers D0 to D15 901) or 64-bits of scalar data (designated registers ED0 to ED15 911). All scalar and vector instructions of all functional units can write to local register file 525. Only instructions of load/store unit 515 may read from local register file 525. Any vector instructions can also write 64-bit data to local register file 525 with the upper 192-bits of data of the result vector being discarded. Any vector instructions can also read 64-bit data from the 64-bit local register file 525 registers. The return data is zero-extended in the upper 192-bits to form an input vector. The registers of local register file 525 can only be used as addresses in load/store instructions, not to store data or as sources for 64-bit arithmetic and logical instructions of load/store unit 515.

FIG. 10 illustrates the predicate register file 526. There are sixteen 32-bit registers in predicate register file 526. Predicate register file 526 contains the results from vector comparison operations executed by either arithmetic and is used by vector selection instructions and vector predicated store instructions. A small subset of special instructions can also read directly from predicate registers, performs operations and write back to a predicate register directly. There are also instructions which can transfer values between the global register files (521 and 522) and predicate register file 526. Transfers between predicate register file 526 and local register files (523, 524 and 525) are not supported. Each bit of a predicate register (designated P0 to P15) controls a byte of a vector data. Since a vector is 256-bits, the width of a predicate register equals 256/8=32 bits. The predicate register file 526 can be written to by vector comparison operations to store the results of the vector compares.

A CPU such as CPU 110, 210, 220, 310, 410 or 420 operates on an instruction pipeline. This instruction pipeline can dispatch up to nine parallel 32-bits slots to provide instructions to the seven execution units (multiply unit 511, correlation unit 512, arithmetic unit 513, arithmetic unit 514, load/store unit 515, branch unit 516 and predication unit 517) every cycle. Instructions are fetched instruction packets of fixed length further described below. All instructions require the same number of pipeline phases for fetch and decode, but require a varying number of execute phases.

Figure 11:
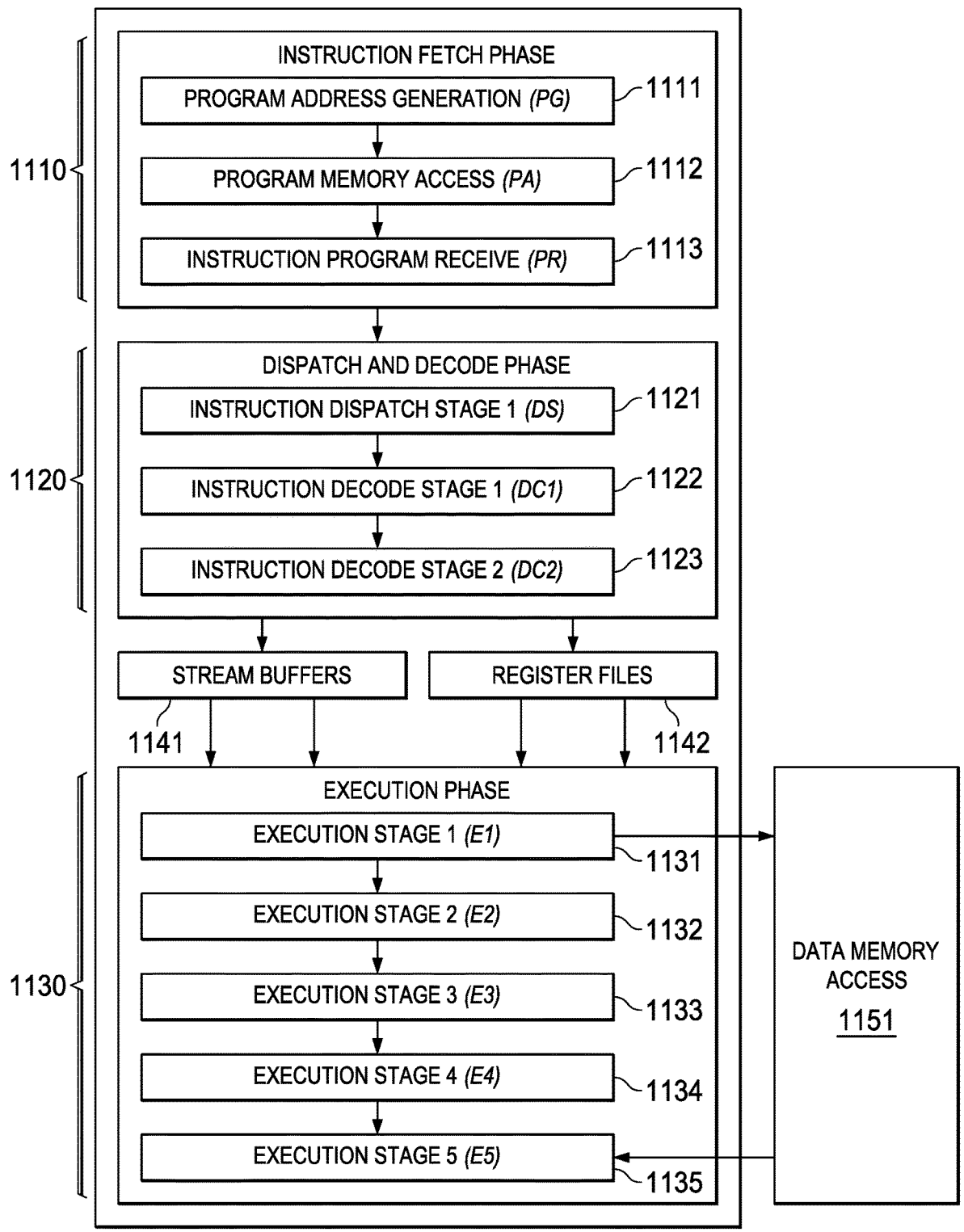
FIG. 11 illustrates pipeline phases of a central processing unit according to a preferred embodiment of this invention.

FIG. 11 illustrates the following pipeline phases: program fetch phase 1110, dispatch and decode phases 1120 and execution phases 1130. Program fetch phase 1110 includes three stages for all instructions. Dispatch and decode phases 1120 include three stages for all instructions. Execution phase 1130 includes one to four stages dependent on the instruction.

Fetch phase 1110 includes program address generation stage 1111 (PG), program access stage 1112 (PA) and program receive stage 1113 (PR). During program address generation stage 1111 (PG), the program address is generated in the CPU and the read request is sent to the memory controller for the level one instruction cache L1I. During the program access stage 1112 (PA) the level one instruction cache L1I processes the request, accesses the data in its memory and sends a fetch packet to the CPU boundary. During the program receive stage 1113 (PR) the CPU registers the fetch packet.

Figure 12:
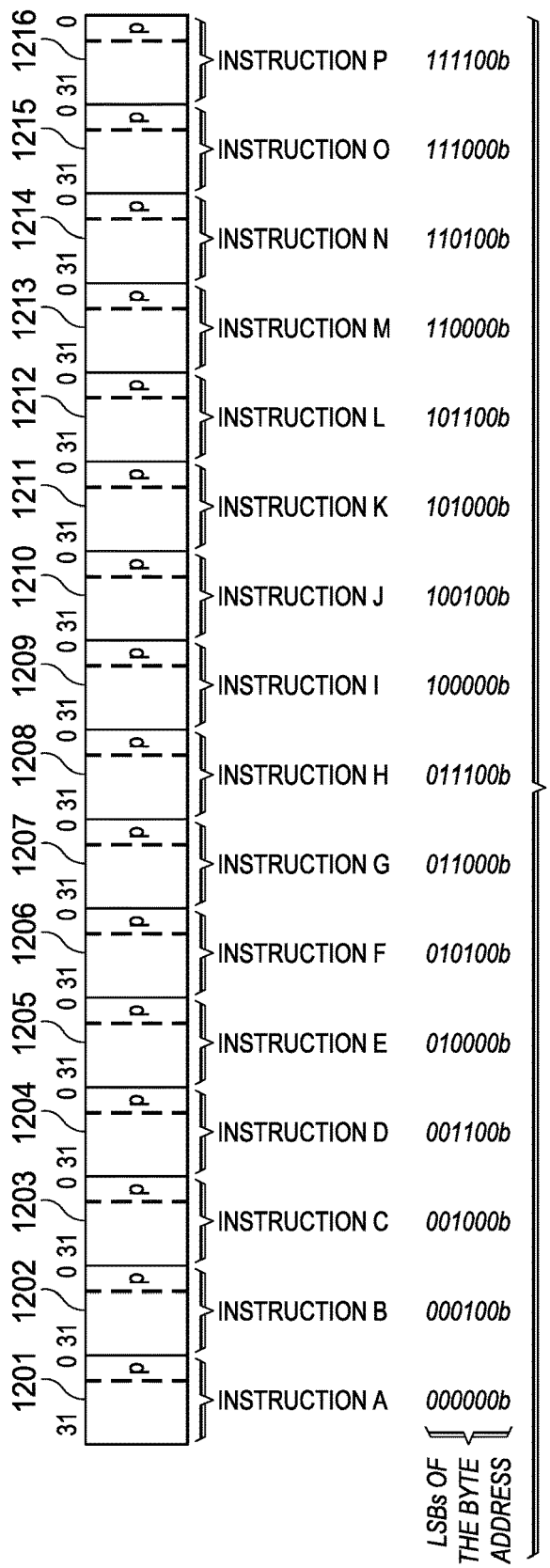
FIG. 12 illustrates sixteen instructions of a single fetch packet.

Instructions are always fetched sixteen words at a time. FIG. 12 illustrates this fetch packet. FIG. 12 illustrates 16 instructions 1201 to 1216 of a single fetch packet. Fetch packets are aligned on 512-bit (16-word) boundaries. The execution of the individual instructions is partially controlled by a p bit in each instruction. This p bit is preferably bit 0 of the instruction. The p bit determines whether the instruction executes in parallel with another instruction. The p bits are scanned from lower to higher address. If the p bit of an instruction is 1, then the next following instruction is executed in parallel with (in the same cycle as) that instruction I. If the p bit of an instruction is 0, then the next following instruction is executed in the cycle after the instruction. All instructions executing in parallel constitute an execute packet. An execute packet can contain up to nine instructions. Each instruction in an execute packet must use a different functional unit. An execute packet can contain up to nine 32-bit wide slots. A slot can either be a self-contained instruction or expand the constant field specified by the immediate preceding instruction. A slot can be used as conditional codes to apply to the instructions within the same fetch packet. A fetch packet can contain up to 2 constant extension slots and one condition code extension slot.

There are up to 11 distinct instruction slots, but scheduling restrictions limit to 9 the maximum number of parallel slots. The maximum nine slots are shared as follows: multiply unit 511; correlation unit 512; arithmetic unit 513; arithmetic unit 514; load/store unit 515; branch unit 516 shared with predicate unit 517; a first constant extension; a second constant extension; and a unit less instruction shared with a condition code extension. The last instruction in an execute packet has a p bit equal to 0.

The CPU and level one instruction cache L1I pipelines are de-coupled from each other. Fetch packet returns from level one instruction cache L1I can take different number of clock cycles, depending on external circumstances such as whether there is a hit in level one instruction cache L1I. Therefore program access stage 1112 (PA) can take several clock cycles instead of 1 clock cycle as in the other stages.

Dispatch and decode phases 1120 include instruction dispatch to appropriate execution unit stage 1121 (DS), instruction pre-decode stage 1122 (DC1); and instruction decode, operand reads stage 1123 (DC2). During instruction dispatch to appropriate execution unit stage 1121 (DS) the fetch packets are split into execute packets and assigned to the appropriate functional units. During the instruction pre-decode stage 1122 (DC1) the source registers, destination registers, and associated paths are decoded for the execution of the instructions in the functional units. During the instruction decode, operand reads stage 1123 (DC2) more detail unit decodes are done, as well as reading operands from the register files.

Execution phases 1130 includes execution stages 1131 to 1135 (E1 to E5). Different types of instructions require different numbers of these stages to complete their execution. These stages of the pipeline play an important role in understanding the device state at CPU cycle boundaries.

During execute 1 stage 1131 (E1) the conditions for the instructions are evaluated and operands are operated on. As illustrated in FIG. 11, execute 1 stage 1131 may receive operands from a stream buffer 1141 and one of the register files shown schematically as 1142. For load and store instructions, address generation is performed and address modifications are written to a register file. For branch instructions, branch fetch packet in PG 1111 phase is affected. As illustrated in FIG. 11, load and store instructions access memory here shown schematically as memory 1151. For single-cycle instructions, results are written to a destination register file. This assumes that any conditions for the instructions are evaluated as true. If a condition is evaluated as false, the instruction does not write any results or have any pipeline operation after execute 1 stage 1131.

During execute 2 stage 1132 (E2) load instructions send the address to memory. Store instructions send the address and data to memory. Single-cycle instructions that saturate results set the SAT bit in the control status register (CSR) if saturation occurs. For 2-cycle instructions, results are written to a destination register file.

During execute 3 stage 1133 (E3) data memory accesses are performed. Any multiply instructions that saturate results set the SAT bit in the control status register (CSR) if saturation occurs. For 3-cycle instructions, results are written to a destination register file.

During execute 4 stage 1134 (E4) load instructions bring data to the CPU boundary. For 4-cycle instructions, results are written to a destination register file.

During execute 5 stage 1135 (E5) load instructions write data into a register. This is illustrated schematically in FIG. 11 with input from memory 1151 to execute 5 stage 1135.

Figure 13:
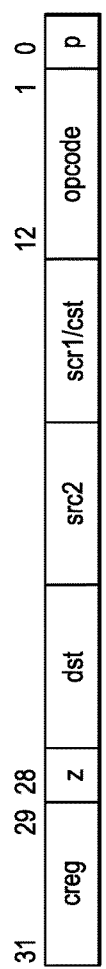
FIG. 13 illustrates an example of the instruction coding of instructions used by this invention.

FIG. 13 illustrates an example of the instruction coding of instructions used by this invention. Each instruction consists of 32 bits and controls the operation of one of the individually controllable functional units (multiply unit 511, correlation unit 512, arithmetic unit 513, arithmetic unit 514, load/store unit 515). The bit fields are defined as follows. The creg field and the z field are optional fields used in conditional instructions. These bits are used for conditional instructions to identify the predicate register and the condition. The z bit (bit 28) indicates whether the predication is based upon zero or not zero in the predicate register. If z=1, the test is for equality with zero. If z=0, the test is for nonzero. The case of creg=0 and z=0 is treated as always true to allow unconditional instruction execution. The creg field and the z field are encoded in the instruction as shown in Table 2.

TABLE 2

| Conditional | creg | | | z |
|---|---|---|---|---|
| Register | 31 | 30 | 29 | 28 |
| Unconditional | 0 | 0 | 0 | 0 |
| Reserved | 0 | 0 | 0 | 1 |
| A0 | 0 | 0 | 1 | z |
| A1 | 0 | 1 | 0 | z |
| A2 | 0 | 1 | 1 | z |
| A3 | 1 | 0 | 0 | z |
| A4 | 1 | 0 | 1 | z |
| A5 | 1 | 1 | 0 | z |
| Reserved | 1 | 1 | x | x |

Note that "z" in the z bit column refers to the zero/not zero comparison selection noted above and "x" is a don't care state. This coding can only specify a subset of the 16 global scalar registers as predicate registers. This selection was made to preserve bits in the instruction coding. Note that unconditional instructions do not have these optional bits. For unconditional instructions these bits (28 to 31) are preferably used as additional opcode bits. However, if needed, an execute packet can contain a unique 32-bit condition code extension slot which contains the 4-bit CREGZ fields for the instructions which are in the same execute packet. Table 3 shows the coding of such a condition code extension slot.

TABLE 3

| Bits | Functional Unit |
|---|---|
| 3:0 | .L |
| 7:4 | .S |
| 11:5 | .D |
| 15:12 | .M |
| 19:16 | .C |
| 23:20 | .B |
| 28:24 | Reserved |
| 31:29 | Reserved |

Thus the condition code extension slot specifies bits decoded in the same way the creg/z bits assigned to a particular functional unit in the same execute packet.

Special vector predicate instructions use the designated predicate register to control vector operations. In the current embodiment all these vector predicate instructions operate on byte (8 bit) data. Each bit of the predicate register controls how a SIMD operation is performed upon the corresponding byte of data. The operations of predicate unit 517 permit a variety of compound vector SIMD operations based upon more than one vector comparison. For example a range determination can be made using two comparisons. A candidate vector is compared with a first vector reference having the minimum of the range packed within a first data register. A second comparison of the candidate vector is made with a second reference vector having the maximum of the range packed within a second data register. Logical combinations of the two resulting predicate registers would permit a vector conditional operation to determine whether each data part of the candidate vector is within range or out of range.

The dst field specifies a register in a corresponding register file as the destination of the instruction results.

The src2 field specifies a register in a corresponding register file as the second source operand.

The src1/cst field has several meanings depending on the instruction opcode field (bits 1 to 12 and additionally bits 28 to 31 for unconditional instructions). The first meaning specifies a register of a corresponding register file as the first operand. The second meaning is an immediate constant. Depending on the instruction type, this is treated as an unsigned integer and zero extended to a specified data length or is treated as a signed integer and sign extended to the specified data length.

The opcode field (bits 1 to 12 for all instructions and additionally bits 28 to 31 for unconditional instructions) specifies the type of instruction and designates appropriate instruction options. This includes designation of the functional unit and operation performed. A detailed explanation of the opcode is beyond the scope of this invention except for the instruction options detailed below.

The p bit (bit 0) marks the execute packets. The p-bit determines whether the instruction executes in parallel with the following instruction. The p-bits are scanned from lower to higher address. If p=1 for the current instruction, then the next instruction executes in parallel with the current instruction. If p=0 for the current instruction, then the next instruction executes in the cycle after the current instruction. All instructions executing in parallel constitute an execute packet. An execute packet can contain up to eight instructions. Each instruction in an execute packet must use a different functional unit.

Code division multiple access (CDMA) is a spread spectrum wireless telephone technique. The data to be transmitted is exclusive ORed (XOR) with a time varying code to produce the signal transmitted. The data rate is typically less than the chip rate of the code. Each user employs a different code to distinguish its transmission from other transmissions. This is the code division of the name.

On reception, an incoming signal is correlated with the code employed by the desired user. If reception code matches the code used by a particular user, the correlation is large. If the reception does not match the code used by the desired user, the correlation is small. This correlation enables each receiver to "tune" to only the transmissions of the desired other user. In the typical wireless telephone system it is not possible to precisely coordinate timing of code modulation and demodulation. Generally pseudo-noise (PN) codes are employed. PN codes appear random but can be deterministically reproduced in the receiver. PN codes are generally uncorrelated but not orthogonal. Thus a signal with an "off" PN code is seen a noise in a receiver using another PN code.

Thus separation of signals such as at a cell base station requires the receiver to correlate each incoming signal with each PN code. With correlations with PN codes matching the transmitted signal becoming prominent over others, the base station can distinguish multiple users without severe interference. This requires much computation particularly during busy times when many PN codes are employed.

In the prior-art these correlations for Rake finger despread, finger search or path monitoring functions, REAH preamble detection operation and perhaps also the transmit correlator functions including spreading and scrambling were typically handled by a hardware accelerator or a special purpose application specific integrated circuit (ASIC). Generally the amount of processing required was beyond the capability of a programmable digital signal processor (DSP). These solutions are costly in terms of silicon area required and thus cost, power, performance and development time.

This invention includes a manner of performing such correlation functions as DSP instructions at a data width permitting real time operation. These techniques require interface with the DSP typically via an external interface. Thus these techniques are slower than a DSP and they can stall the DSP. The invention implements chip rate functionality inside the DSP using an efficient instruction set implementation. This eliminate the needs for a DSP external interface which uses buffers and controls the external accelerator and the DSP. This invention and shares hardware for other DSP functions. This invention operates at the DSP clock frequency which is typically faster than the accelerator clock frequency.

Figure 15:
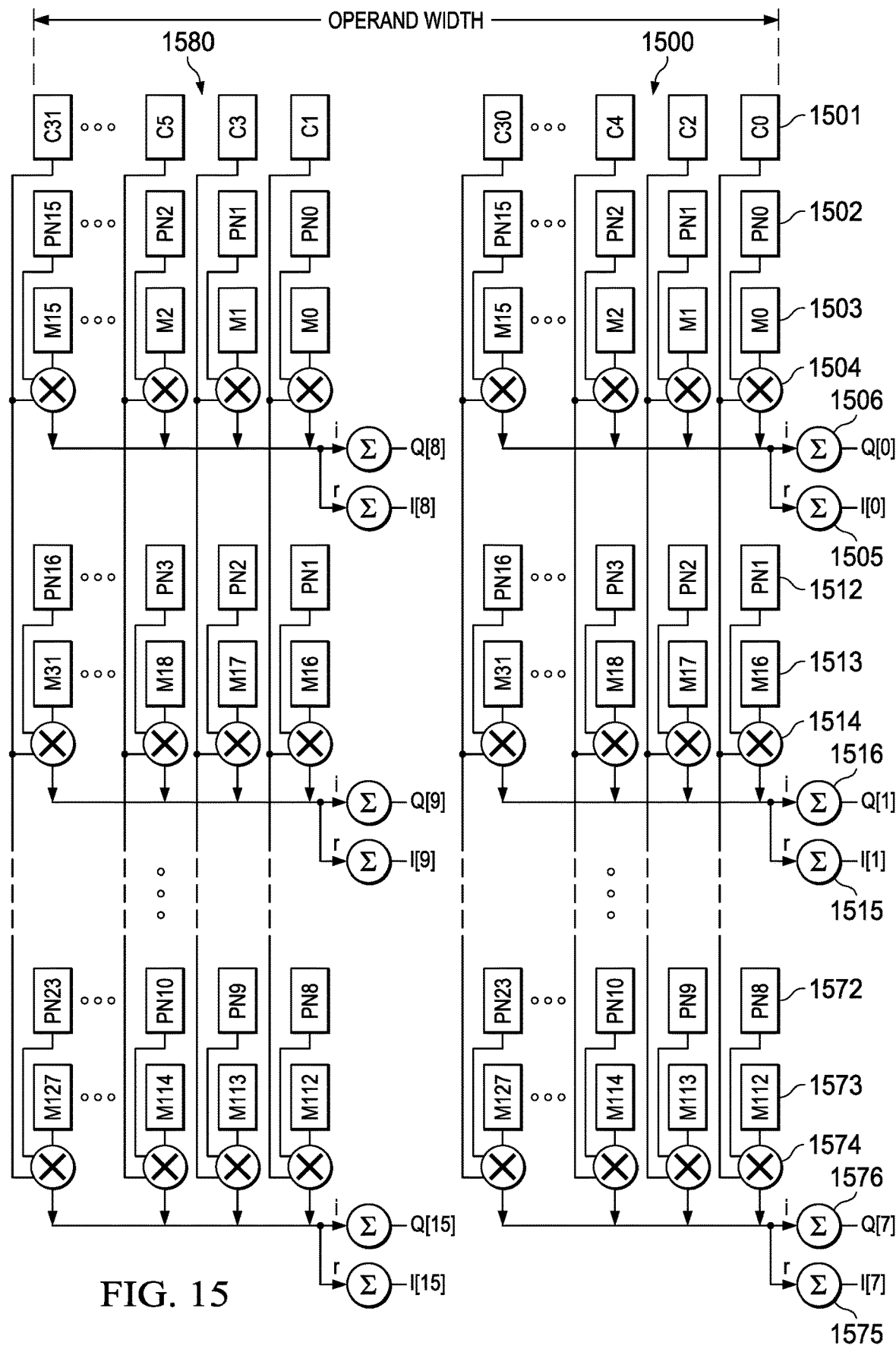
FIG. 15 illustrates a first example of the organization of the correlation unit implementing a class of instructions to perform the correlation operation such as used in a chip rate search operation.

FIG. 15 illustrates organization of correlation unit 512 implementing a class of instructions to perform the correlation operation such as used in a chip rate search operation as described above. The signal input is c from c0 to c31. In accordance with the preferred embodiment of the invention each data word ci is packed data including a signed real part and a signed imaginary part. The operand width of the correlation unit 512 (512 bits) is divided into an even half 1500 and an odd half 1580. In the preferred embodiment a 512 bit operand is specified by a pair of 256-bit registers. The register number of the operand field of the instruction is limited to an even register number. The 512 bit operand has 256 bits stored in the designated register number and the 256 bits stored in the register with the next higher register number. Even data words of the input C are supplied to even half 1500 (co, c2, c4 . . . c30) and odd data words are supplied to odd half 1580 (c1, c3, c5 . . . c31). Referring to example parts 1501 to 1506, the correlation unit 512 receives a first input data word 1501 C (preferably specified by a second operand src2 in FIG. 13), a second input data word 1502 PN (preferably specified by a first operand src1 in FIG. 13) and a mask input 1503 (preferably stored in an implicitly specified control register). These three values are multiplied by multiplier 1504. Real portions r(0) of the complex number product are added in summer 1505. Imaginary portions i(0) of the complex number product are added in summer 1506. As shown in FIG. 15 multiplier 1504 receives c input 1501, PN input 1512 and mask input 1513. Real portions r(1) of the complex number product are added in summer 1515. Imaginary portions i(1) of the complex number product are added in summer 1516. Multiplier 1574 receives c input 1501, PN input 1572 and mask input 1573. Real portions r(7) of the complex number product are added in summer 1575. Imaginary portions i(7) of the complex number product are added in summer 1576. The 512 bit results are stored in a register pair corresponding to dst (FIG. 13). The register number of the dst field of the instruction is limited to an even register number. The 256 lower bits of the 512 bit operand are stored in the designated register number and the 256 bits upper bits are stored in the register with the next higher register number.

A first instruction of this class named DVCDOTPM32OPN16B32H receives 32 16 bit complex inputs having 8-bit real parts and 8-bit imaginary parts from c0 to c31 as src2. This instruction receives 128 2-bit PN code codes as src1. The values and coding of these PN codes is described below. This instruction receives 128 1-bit mask input from m0 to m127 from a control register. This instruction produces 16 32 bit complex outputs having 16-bit real parts r(0) to r(15) and 16-bit imaginary parts i(0) to i(15) from multiplying complex c inputs with PN code and Mask and horizontally separately accumulating real and imaginary parts of the products. A PN offset is 32 bits for each consecutive output. This is illustrated in FIG. 15.

A second instruction of this class named DVCDOTPM2OPN16B32H receives 32 16 bit complex inputs having 8-bit real parts and 8-bit imaginary parts from c0 to c31 as src2. This instruction receives 24 2-bit PN code codes as src1. The values and coding of these PN codes is described below. This instruction receives 128 1-bit mask input from m0 to m127 from a control register. This instruction produces 16 32 bit complex outputs having 16-bit real parts r(0) to r(15) and 16-bit imaginary parts i(0) to i(15) from multiplying complex c inputs with PN code and Mask and horizontally separately accumulating real and imaginary parts of the products. A PN offset is 2 bits for each consecutive output. This is similar to that illustrated in FIG. 15.

Figure 16:
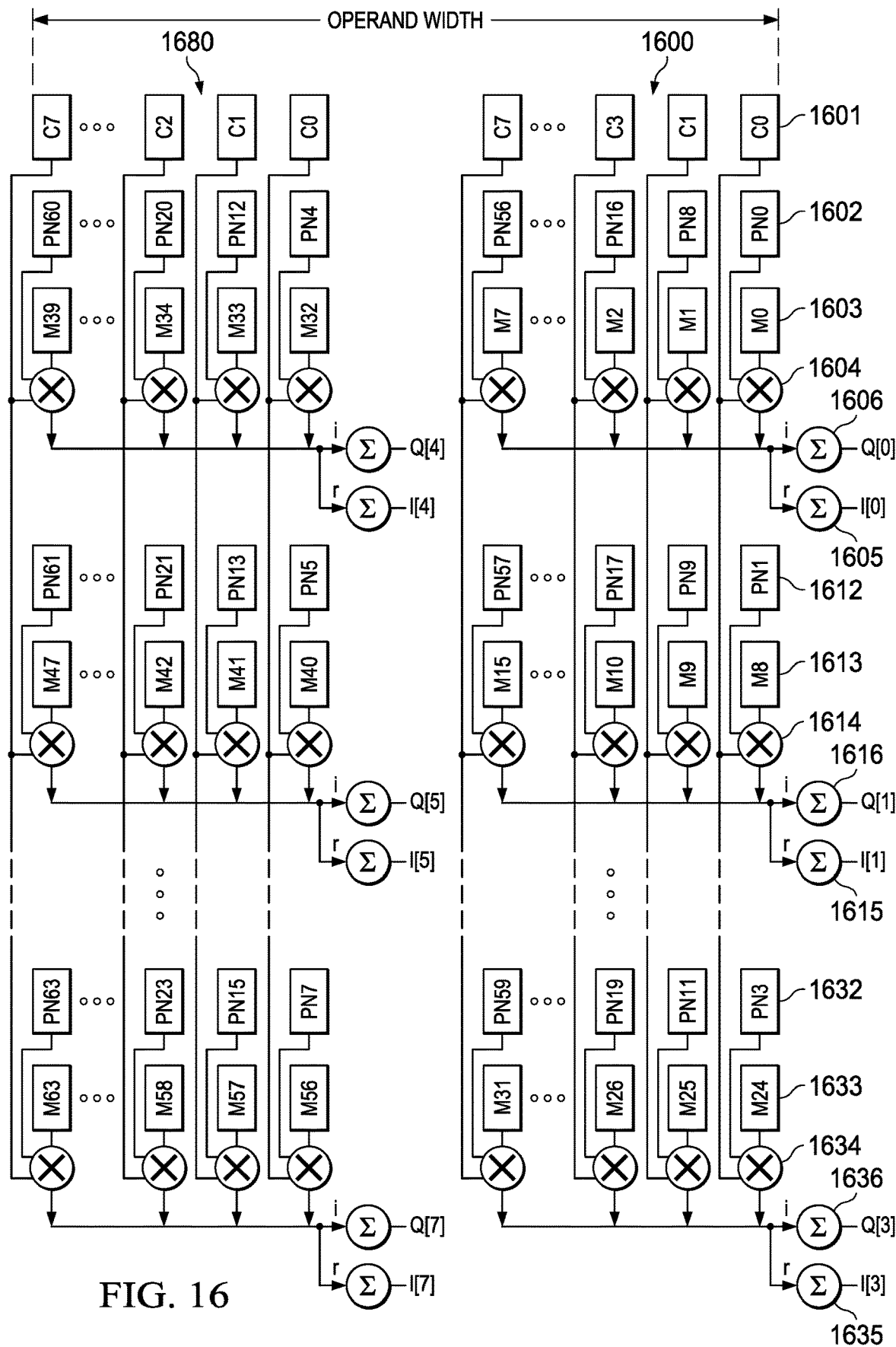
FIG. 16 illustrates a second example of the organization of the correlation unit implementing a class of instructions to perform the correlation operation such as used in a chip rate search operation.

A third instruction of this class named DVCDOTPM2OPN8H16W receives 8 32 bit complex inputs having 16-bit real parts and 16-bit imaginary parts from c0 to c7 as src2. This instruction receives 64 2-bit PN code codes as src1. The values and coding of these PN codes is described below. This instruction receives 64 1-bit mask input from m0 to m63 from a control register. This instruction produces 8 64 bit complex outputs having 32-bit real parts r(0) to r(7) and 32-bit imaginary parts i(0) to i(7) from multiplying complex c inputs with PN code and Mask and horizontally separately accumulating real and imaginary parts of the products. A PN offset is 2 bits for each consecutive output. This is illustrated in FIG. 16 in which similar parts have similar reference numbers as FIG. 15.

A fourth instruction of this class named DVCDOTPM2OPN8W16W receives 8 64 bit complex inputs having 32-bit real parts and 32-bit imaginary parts from c0 to c7 as src2. This instruction receives 64 2-bit PN code codes as src1. The values and coding of these PN codes is described below. This instruction receives 64 1-bit mask input from m0 to m63 from a control register. This instruction produces 8 64 bit complex outputs having 32-bit real parts r(0) to r(7) and 32-bit imaginary parts i(0) to i(7) from multiplying complex c inputs with PN code and Mask and horizontally separately accumulating real and imaginary parts of the products. A PN offset is 2 bits for each consecutive output. This is illustrated in FIG. 16 in which similar parts have similar reference numbers as FIG. 15.

Though called multipliers elements 1504, 1514, 1574, 1604, 1614 and 1603 are simplified based upon the nature of the PN code. In accordance with the known art the PN codes can have only the five following values: 1; −1; j; −j; and 0. Mask input m is used for the case PN=0. If PN=0, then the corresponding mask input m is 0, causing the product to be 0. In PN is not 0, then mask input m is 1. As noted above the other PN code allowed values are encoded in a 2-bit code. This 2-bit PN code is shown in Table 4.

TABLE 4

| PN Code | PN Value |
|---------|----------|
| 00 | 1 |
| 01 | j |
| 10 | −j |
| 11 | −1 |

Table 6 shows the product results for all possible values of m and PN. In Table 5 the real input is designated R, which may be 16 bits, 32 bits or 64 bits. Similarly, the imaginary input is designated I, which may be 16 bits, 32 bits or 64 bits.

TABLE 5

| M | PN Code | PN Value | Real Part | Imaginary Part |
|---|---------|----------|-----------|----------------|
| 0 | xx | xx | 0 | 0 |
| 1 | 00 | 1 | R | I |
| 1 | 01 | j | −I | R |
| 1 | 10 | −j | I | −R |
| 1 | 11 | −1 | −R | −I |

The xx designation is a don't care input. The real part R and the imaginary part I of the product are 0 if m is 0 regardless of the PN code or PN value. If the PN value is 1, then product output is R+jI. If the PN value is j, then the product is −I+jR. If the PN value is −j, then the product is I−jR. If the PN value is −1, then the product is −R−jI.

Figure 17:
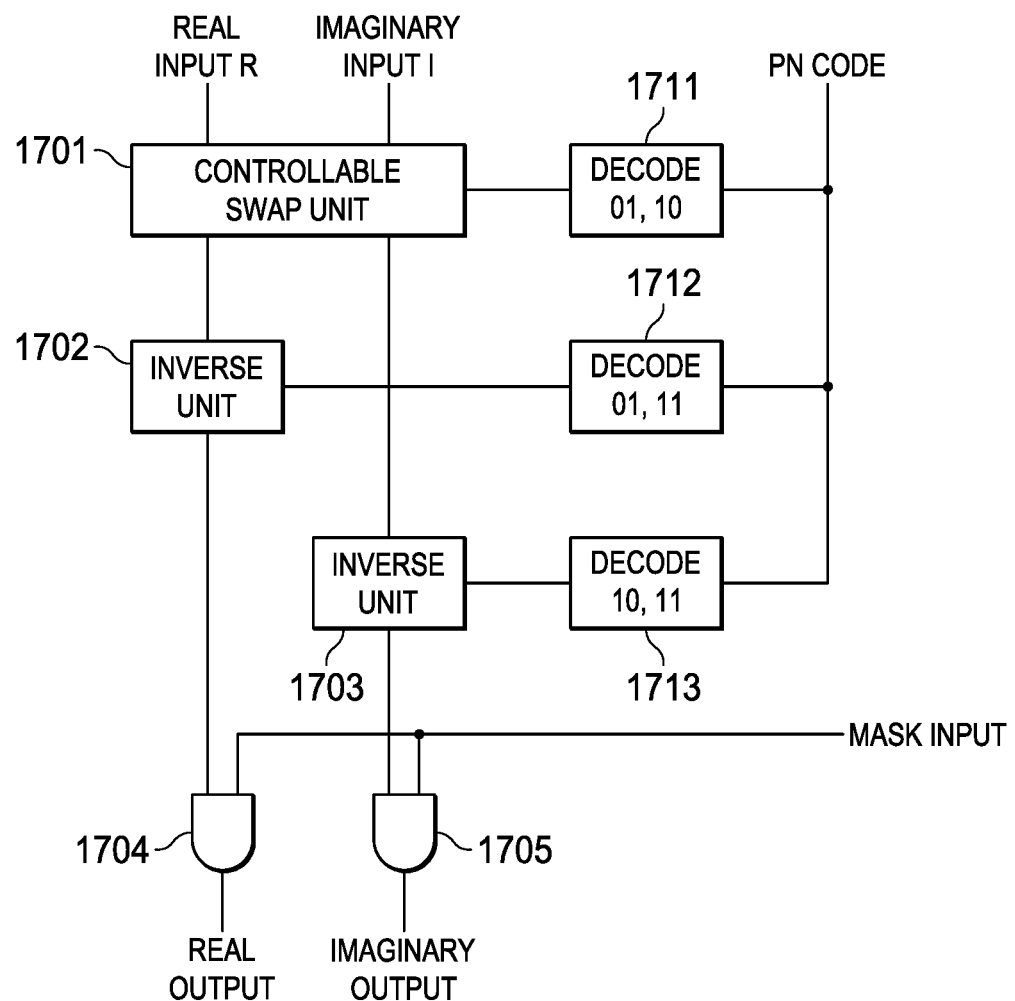
FIG. 17 is a block diagram of the simplified multipliers illustrated in FIGS. 15 and 16.

FIG. 17 is a block diagram of simplified multipliers 1504, 1514, 1574, 1604, 1614 and 1603 implementing the results of Table 6. Real input R and imaginary input I supply two inputs of controllable swap unit 1701. If decoder 1711 determines the PN code is 01 or 10 corresponding to j and −j, then controllable swap unit 1701 swaps the R and I values. Otherwise controllable swap unit 1701 does not swap the R and I values. Inverse unit 1702 performs an arithmetic inversion on its input inverting the real part if decoder 1712 determines the PN code is 01 or 11. This arithmetic inversion may be performed by a two's complement of the input number. The two's complement is based upon the relation −X=~X+1. A two's complement can thus be generated by inverting the number and adding 1. Otherwise inverse unit 1702 leaves its input unchanged. Inverse unit 1703 performs an arithmetic inversion its input inverting the imaginary part if decoder 1713 determines the PN code is 10 or 11. Otherwise inverse unit 1703 leaves its input unchanged. AND gates 1704 and 1705 pass their inputs from respective inverse units 1702 and 1703 if m is 1. Otherwise AND gates 1704 and 1705 output all 0s. As noted above the real input R and the imaginary input I can be 16 bits, 32 bits or 64 bits. Controllable swap unit 1701, inverse units 1702 and 1703 and AND gates 1704 and 1705 have data widths corresponding to the data width of the currently executing instruction. In addition the real output and the imaginary output are zero extended if necessary to the data width of the instruction executing.

The invention provides the advantages of higher performance, less area and power over the prior art. These advantages come because it does not require an external interface to the DSP and it runs at DSP clock speed. The invention enables a higher density transmit chip rate solutions or a higher density RACH preamble detection solution than previously enabled. The invention can carry out 256 complex multiplies per cycle which is greater than the 8 complex multiplies of the DSP prior art.

This invention includes the calculation of sum of absolute differences (SAD) between two pixel blocks. This computation is often used as a similarity measure. A lower the sum of absolute differences corresponds to a more similar pair of pixel blocks. This computation is widely used in determining a best motion vector in video compression. The two pixel blocks compared are corresponding locations in time adjacent frames. One block slides within an allowed range of motion and the sum of the absolute differences between the two pixel blocks determines their similarity. A motion vector is determined from the horizontal and vertical displacement between pixel blocks yielding the smallest sum of absolute differences (greatest similarity). This search for a best motion vector is thus very computationally intensive.

The prior art implemented Sum of Absolute Difference (SAD) for specific macro block search, such as 16×16 or 8×8, using a single horizontal pixel line search for Full Search Block Matching (FSBM). This invention implements faster and more power efficient SAD operations for different search block sizes, such as 1×32×32, 2×16×16, 2×8×8, 2×5×5, 2 4×4. These block sizes can be dynamically configured using mask bits in a control register and using double horizontal pixel lines search.

This invention includes correlation unit C 512 instructions for implementing a SAD computation. These instructions calculate the sum of absolute difference between two inputs. This absolute difference is accumulated between two pixels across 16 or 8 pixels based on input precision for each output. This is repeated with window offset by the pixel size for other outputs. A mask bit configures to different block size by zeroing out the absolute difference contribution of pixels outside the block. Thus these absolute differences do not contribute to the sum.

A first instruction of this class is called DVSADM8O16B16H (dual horizontal lines) which implements a sliding window correlation using sum of absolute difference of the unsigned 8 bit candidate and reference pixels at an offset of 8 bits or 1 pixel. This instruction uses a double horizontal line search (c(0) to c(15) and c(16) to c(31)). This instruction takes two sets of unsigned 8 bit candidate pixels (c(0) to c(15) and c(16) to c(c31)) as the src2 input and two sets of unsigned 8 bit reference pixels (r(0) to r(30) and r(32) to r(62)) as src1 input. This instruction also receives 2 sets of 1 bit mask (mask(0) to mask(15) and mask(16) to mask(31)) from an implicitly specified control register. This instruction accumulates sum of absolute differences between candidate and reference pixels across two sets of 16 pixels and produce 2 outputs of half word precision. This instruction repeats this calculation for 2 sets of candidate pixel in src2 against 2×16 sets of 16 pixels in src1 and produces 16 half-words (16 bit) outputs. The mask input can zero out SAD contribution to accumulation and configure a different block search. The operand width of 256 bits (32 pixels by 8 bits per pixel) is selected by a single vector operand. The output width of 512 bits (32 SADs of 16 bits each) is stored in a register pair corresponding to dst (FIG. 13). The register number of the dst field of the instruction is limited to an even register number. The 256 lower bits of the 512 bit operand are stored in the designated register number and the 256 bits upper bits are stored in the register with the next higher register number.

Figure 18A:
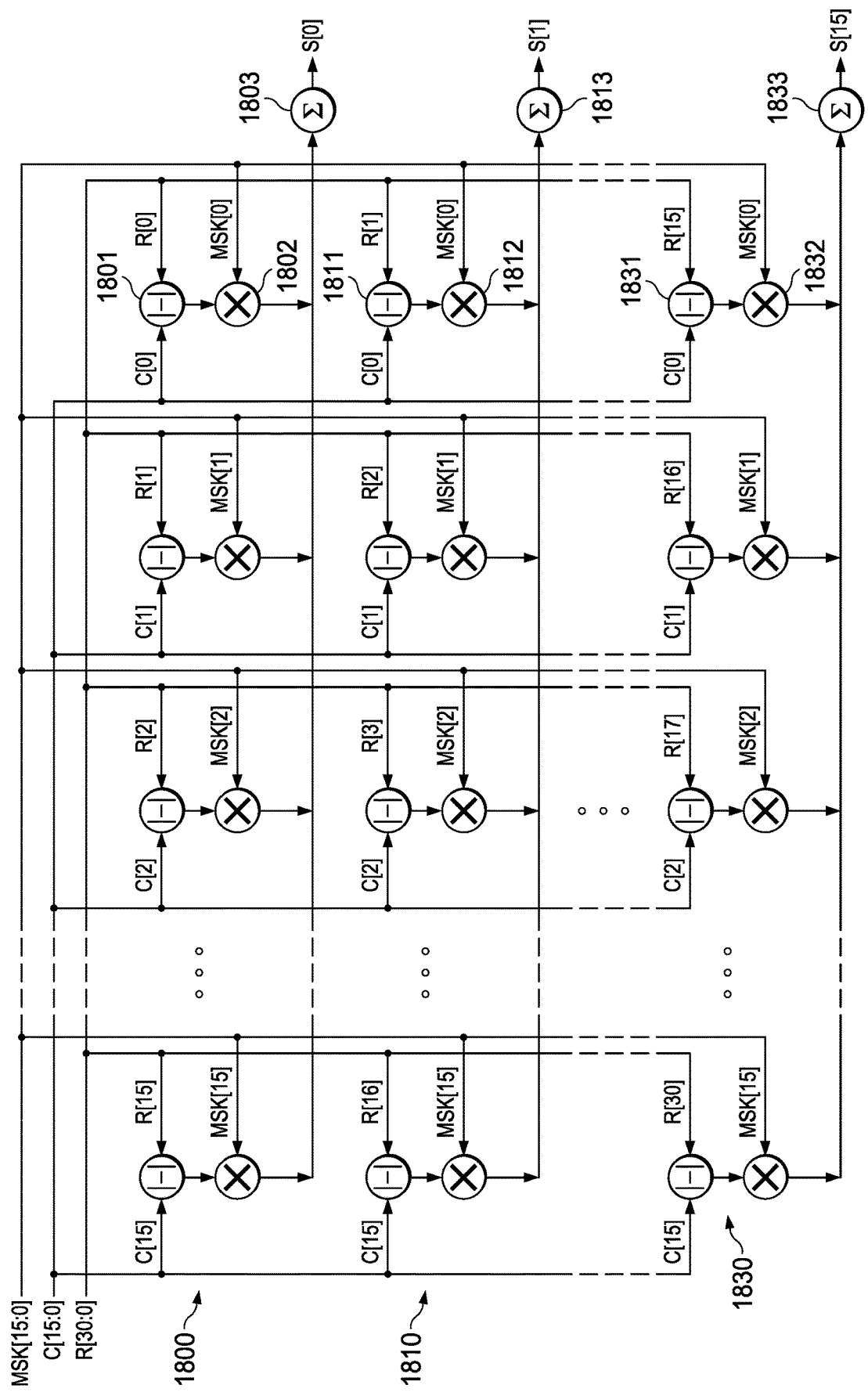
FIGS. 18A and 18B together illustrate a first example of a SAD instruction according to this invention.
Figure 18B:
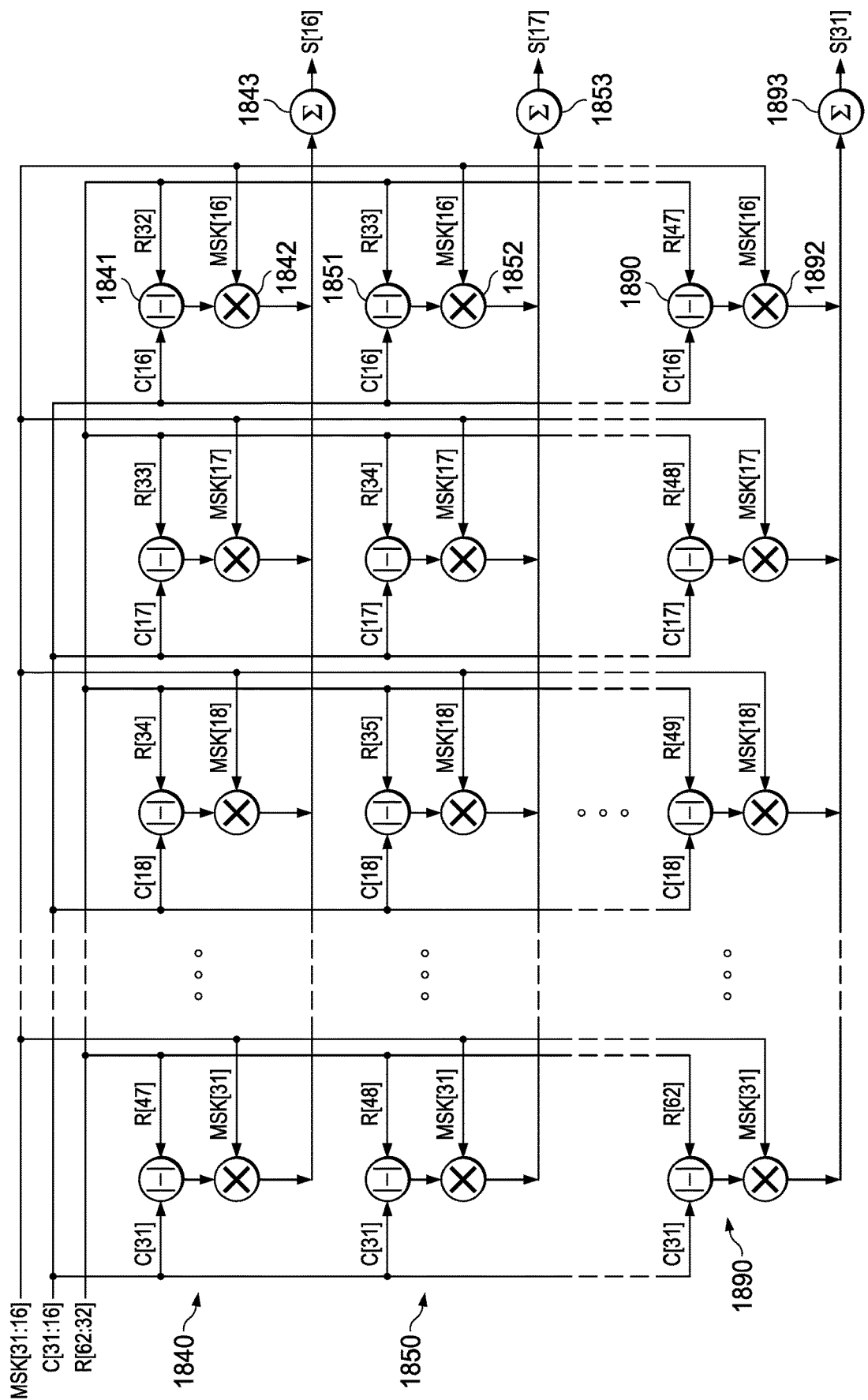

This instruction is illustrated in FIGS. 18A and 18B. FIG. 18A illustrates 16 rows 1800, 1810 . . . 1830. Each row includes 16 absolute value of difference units such as 1801, 1811 . . . 1831. The absolute value of difference units receive a first input of a corresponding candidate pixel c(i) and a second input of a corresponding reference pixel r(i). A multiplier such as multipliers 1802, 1812 . . . 1832 receives the absolute value and corresponding mask bit m(i). The product is supplied to the summer 1803, 1813 . . . 1833 of the corresponding row. FIG. 18B illustrates a second half including 16 rows 1840, 1850 . . . 1890. Each row includes 16 absolute value of difference units such as 1841, 1851 . . . 1891. The absolute value of difference units receive a first input of a corresponding candidate pixel c(i) and a second input of a corresponding reference pixel r(i). A multiplier such as multipliers 1842, 1852 . . . 1892 receives the absolute value and corresponding mask bit m(i). The product is supplied to the summer 1843, 1853 . . . 1893 of the corresponding row. As shown in FIG. 18A for the first half the in row 1800 the candidate and the reference pixels have the same index. Thus row 1800 receives candidates pixels c(0) to c(15) and reference pixels r(0) to r(15). For each following row the reference pixels are offset by one pixel. Thus row 1830 receives candidate pixels c(0) to c(15) as other rows but receives reference pixels r(15) to r(30). As shown in FIG. 18B for the second half the in row 1840 receives candidate pixels c(16) to c(31) and the reference pixels r(32) to r(47). For each following row the reference pixels are offset by one pixel. Thus row 1890 receives candidate pixels c(16) to c(31) as other rows but receives reference pixels r(62) to r(47). The whole apparatus of FIGS. 18A and 18B generates 32 16 bit sum of absolute differences s(0) to s(31).

A second instruction of this type called DVSADM16O8H8W (dual horizontal lines) which implements a sliding window correlation using sum of absolute difference of the unsigned 16 bit candidate pixels and reference pixels at an offset of 16 bits or 1 pixel. This instruction used a uses double horizontal line search (c(0) to c(7) and c(8) to c(15)). This instruction takes two sets of unsigned 16-bit candidate pixels (c(0) to c(7) and c(8) to c(c15)) as src2 input. This instruction takes two sets of unsigned 16-bit reference pixels (r(0) to r(14) and r(15) to r(30)) as src1 input. This instruction takes 2 sets of 1 bit mask (mask(0) to mask(7) and mask(8) to mask(15)) from an implicitly defined control register. This instruction accumulates sum of absolute differences between src2 and src1 pixels across two sets of 8 pixels and produce 2 outputs of word (32 bit) precision. This instructions repeats this calculation for 2 sets of candidate pixels in src2 against 2×8 sets of 8 pixels in src1 and produces 8 word (32 bit) outputs The mask input can zero out SAD contribution to accumulation and configure a different block search. The operand width of 256 bits (16 pixels by 16 bits per pixel) is selected by a single vector operand. The output width of 512 bits (16 SADs of 32 bits each) is stored in a register pair corresponding to dst (FIG. 13). The register number of the dst field of the instruction is limited to an even register number. The 256 lower bits of the 512 bit operand are stored in the designated register number and the 256 bits upper bits are stored in the register with the next higher register number.

Figure 19A:
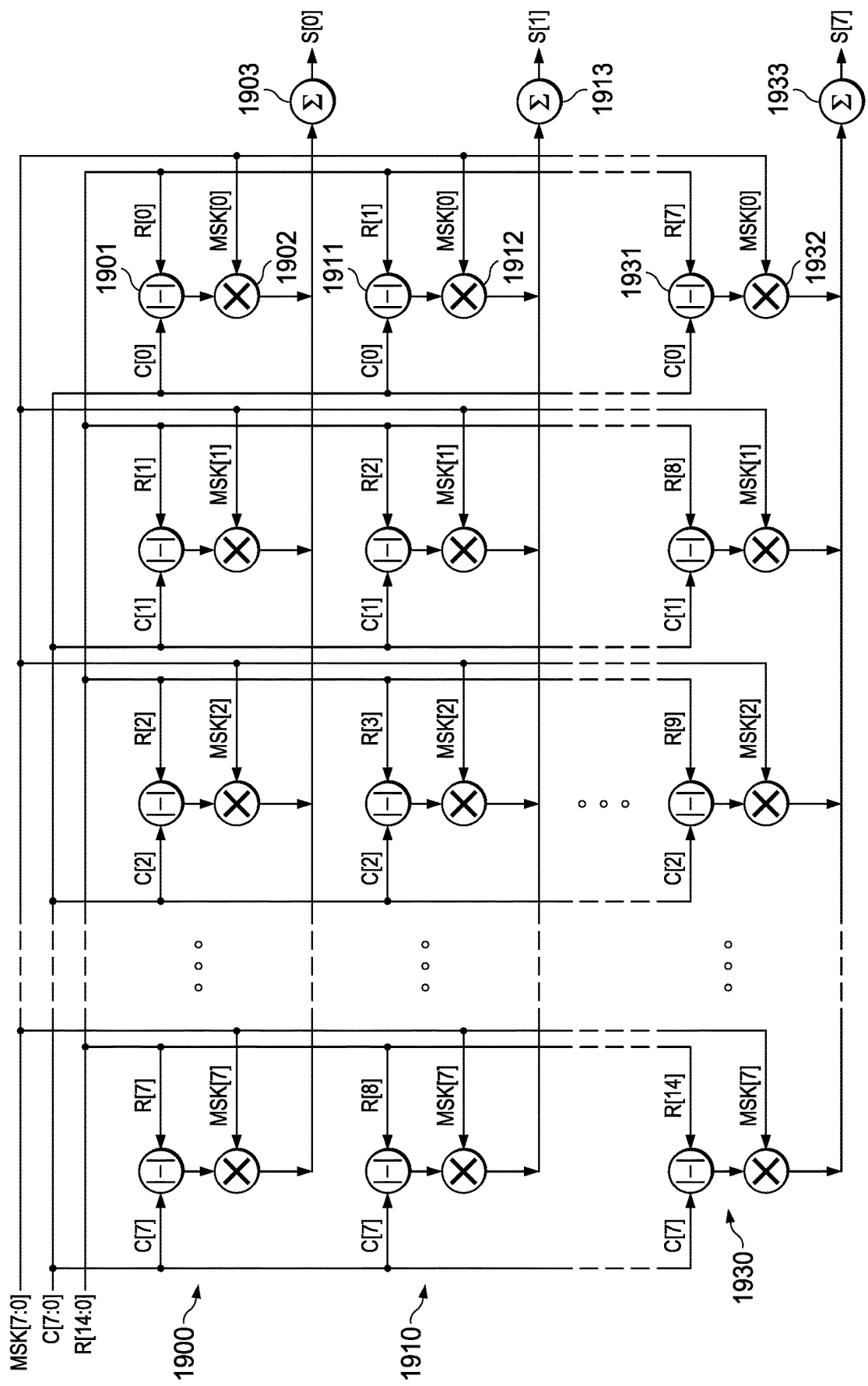
FIGS. 19A and 19B together illustrate a second example of a SAD instruction according to this invention.
Figure 19B:
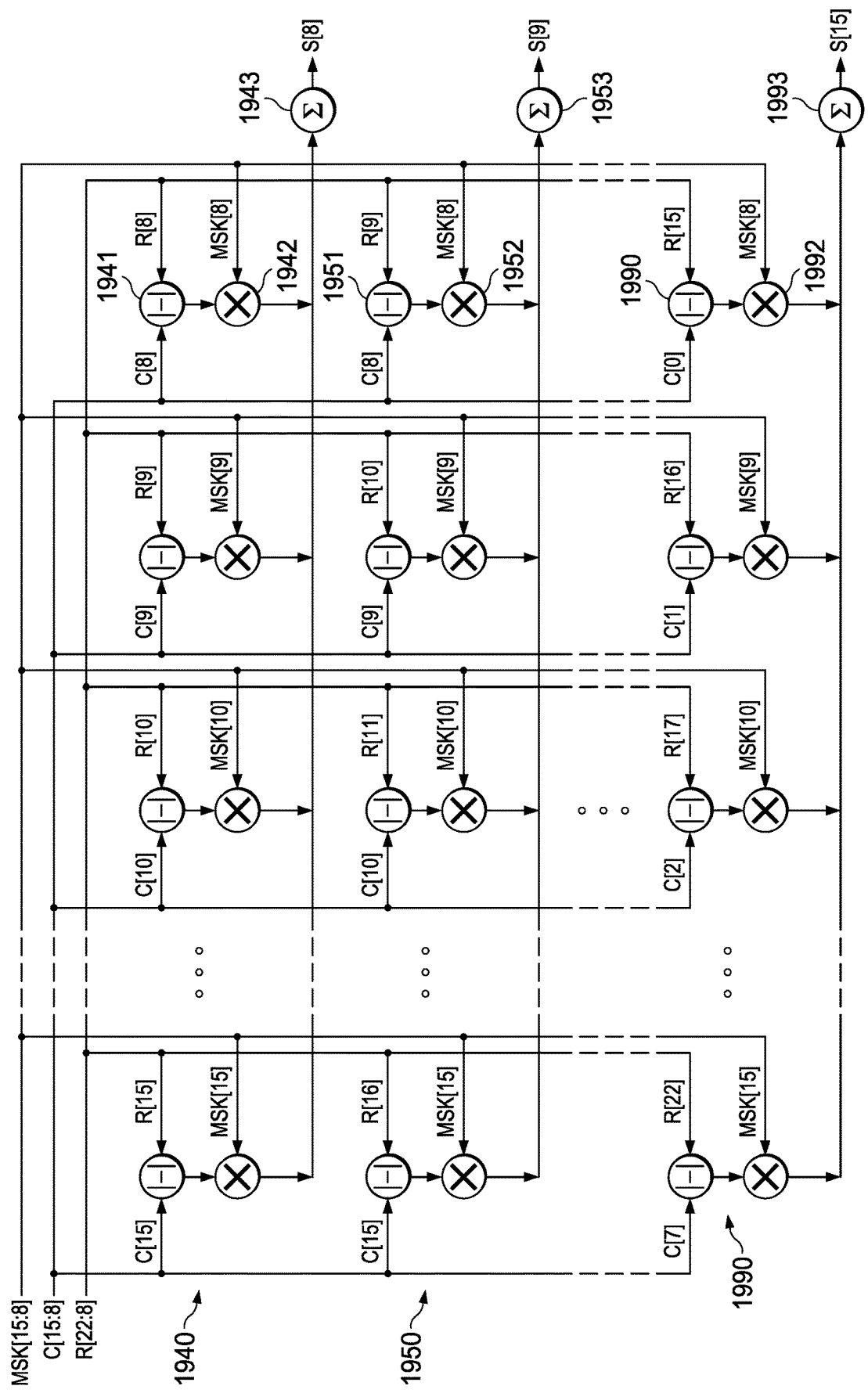

This instruction is illustrated in FIGS. 19A and 19B. FIG. 19A illustrates 8 rows 1900, 1910 . . . 1930. Each row includes 8 absolute value of difference units such as 1901, 1911 . . . 1931. The absolute value of difference units receive a first input of a corresponding candidate pixel c(i) and a second input of a corresponding reference pixel r(i). A multiplier such as multipliers 1902, 1912 . . . 1932 receives the absolute value and corresponding mask bit m(i). The product is supplied to the summer 1903, 1913 . . . 1933 of the corresponding row. FIG. 19B illustrates a second half including 8 rows 1940, 1950 . . . 1990. Each row includes 8 absolute value of difference units such as 1941, 1951 . . . 1991. The absolute value of difference units receive a first input of a corresponding candidate pixel c(i) and a second input of a corresponding reference pixel r(i). A multiplier such as multipliers 1842, 1852 . . . 1892 receives the absolute value and corresponding mask bit m(i). The product is supplied to the summer 1853, 1853 . . . 1893 of the corresponding row. As shown in FIG. 18A for the first half the in row 1800 the candidate and the reference pixels have the same index. Thus row 1800 receives candidates pixels c(0) to c(7) and reference pixels r(0) to r(7). For each following row the reference pixels are offset by one pixel. Thus row 1830 receives candidate pixels c(0) to c(7) as other rows but receives reference pixels r(7) to r(14). As shown in FIG. 18B for the second half the in row 1840 receives candidate pixels c(8) to c(15) and the reference pixels r(8) to r(16). For each following row the reference pixels are offset by one pixel. Thus row 1890 receives candidate pixels c(8) to c(15) as other rows but receives reference pixels r(15) to r(22). The whole apparatus of FIGS. 19A and 19B generates 16 32 bit sum of absolute differences s(0) to s(15).

Figure 20:
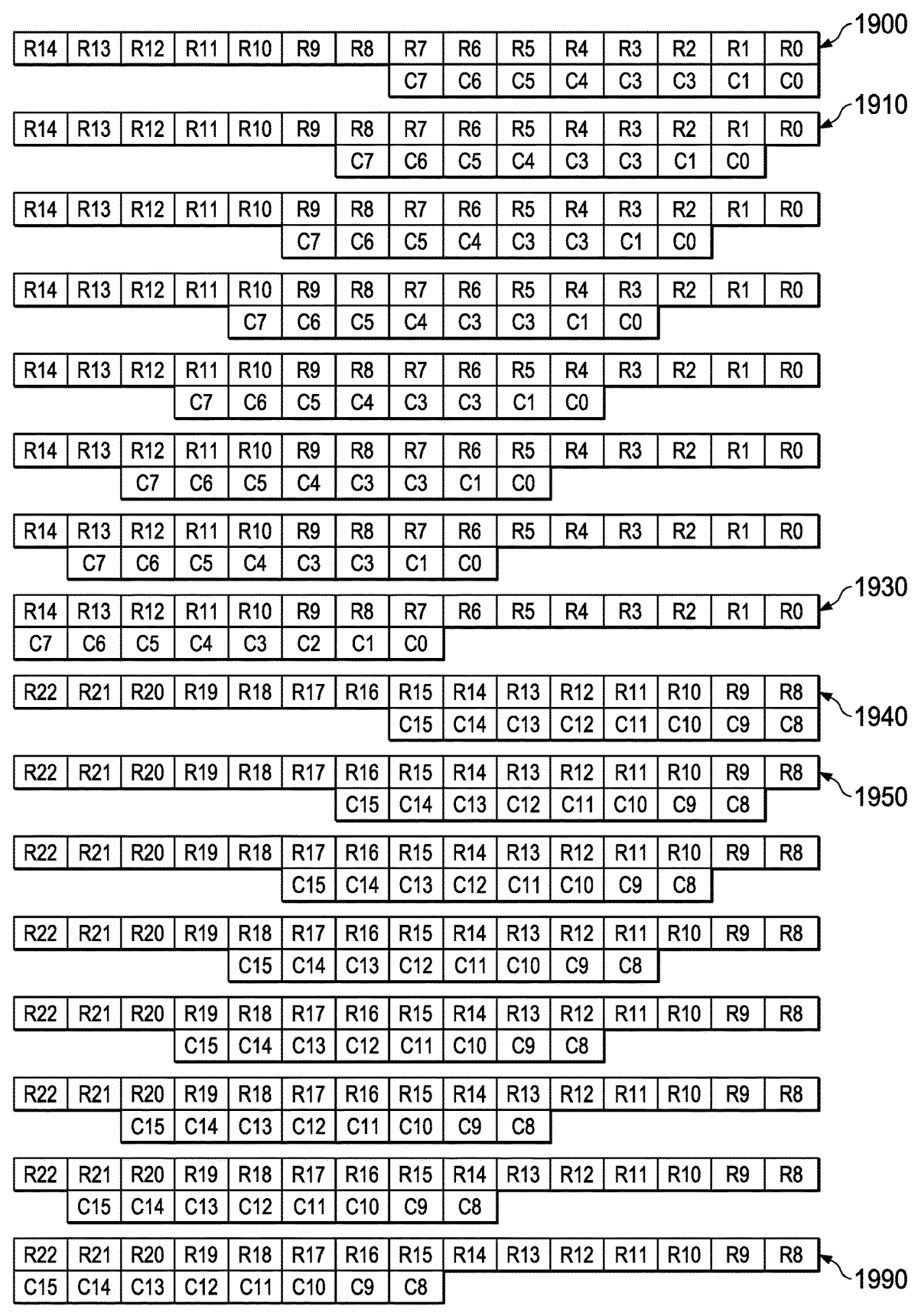

FIG. 20 schematically illustrates the comparisons of the DVSADM16O8H8W instruction illustrated in FIGS. 19A and 19B. Row 1900 forms the SAD of the candidate pixels c(0) to c(7) with respective reference pixels r(0) to r(7). Row 1910 forms the SAD of the candidate pixels c(0) to c(7) with respective reference pixels r(1) to r(8). The candidate pixels shift relative to the reference pixels and row 1930 forms the SAD of the candidate pixels c(0) to c(7) with respective reference pixels r(7) to r(14). The second 8 rows are completely distinct from the first 8 rows. Row 1940 forms the SAD of the candidate pixels c(8) to c(15) with respective reference pixels r(9) to r(15). Row 1950 forms the SAD of the candidate pixels c(8) to c(15) with respective reference pixels r(9) to r(16). The candidate pixels shift relative to the reference pixels and row 1990 forms the SAD of the candidate pixels c(8) to c(15) with respective reference pixels r(15) to r(22). With appropriate packing of pixel data this one instruction can form SAD calculations for two rows of a candidate block. A similar schematic view of the DVSADM8O16B16H instruction illustrated in FIG. 18A and 18B is possible. This view is similar to FIG. 20 but is omitted because the number of pixels and rows would make illustration too busy.

A third instruction DVSADM8O16B32H is same as DVSADM8O16B16H except that it searches one horizontal line candidate pixels across 32 sets of 16 reference pixels.

A fourth instruction DVSADM16O8H16W is same as DVSADM16O8H8W except that it searches one horizontal line candidate pixels across 16 sets of 8 reference pixels.

Figure 21:
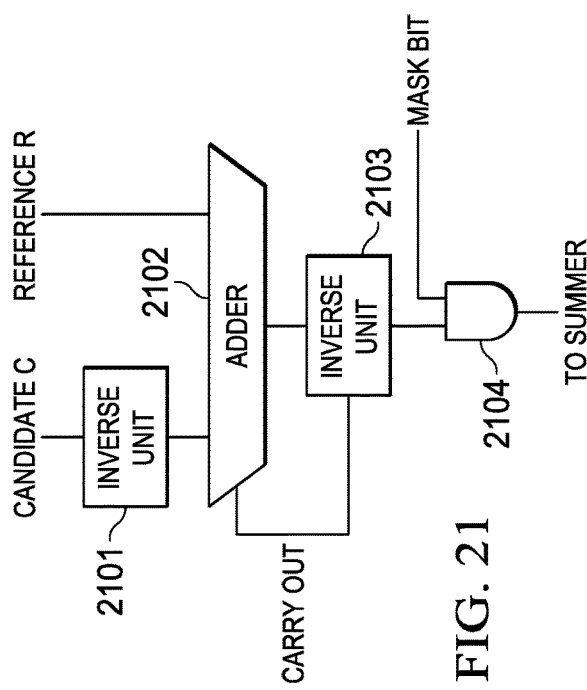
FIG. 21 illustrates a manner to implement the absolute value of difference units and corresponding multipliers illustrated in FIGS. 18A, 18B, 19A and 19B.

FIG. 21 illustrates a manner to implement the absolute value of difference units and corresponding multipliers illustrated in FIGS. 18A, 18B, 19A and 19B. The difference is formed by inversion and addition. Inverse unit 2101 forms the arithmetic inverse of the candidate pixel input c. This arithmetic inversion may be performed by a two's complement of the input number. The two's complement is based upon the relation $-X=\sim X+1$. A two's complement can thus be generated by inverting the number and adding 1. The addition of 1 can be achieved by asserting a carry input to the lowest bit of adder 2102. Adder 2102 adds the inverse of the candidate input and the reference input. Adder 2102 may generate an active carry output depending on the data inputs. If adder 2102 does not generate an active carry output, then the reference pixel value is greater than the candidate pixel value and the sum is positive. Thus the absolute value of the difference is the same as the difference. If adder 2102 generates an active carry output, then the candidate pixel value is greater than the reference pixel value and the sum is positive. Thus the absolute value of the difference is the arithmetic inverse of the difference. Inverse unit 2103 forms the arithmetic inverse the output of adder 2102 if adder 2102 generates an active carry output. Otherwise inverse unit 2103 leaves its input unchanged. Multipliers 1803, 1813, 1833, 1843, 1853, 1893, 1903, 1913, 1933, 1943, 1953 and 1993 are implemented via and AND gate 2104 because the mask input is a single bit. If the mask input is 1, then the absolute value is unchanged. If the mask value is 0, then the absolute value is set of all 0s. The output of AND gate 2104 is supplied to an input of the summer of the corresponding row.

Figure 14:
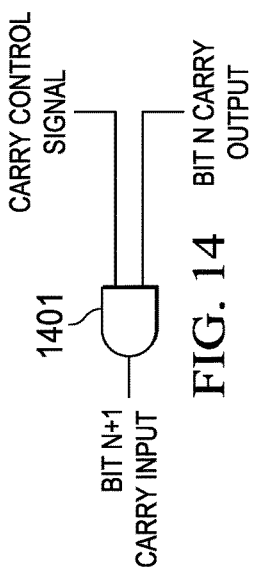
FIG. 14 illustrates an example carry control circuit.

This illustrates how the same hardware can be used to perform the two instructions DVSADM8O16B16H (FIGS. 18A and 18B) and DVSADM16O8H8W (FIGS. 19A and 19B). The adders 2102 can be constructed with carry control as shown in FIG. 14. In a first mode adders 2102 operate on 8 bit data by breaking the carry chain at 8 bit boundaries (DVSADM8O16B16H). In a second mode adders 2102 operate on 16 bit data by breaking the carry chain at 16 bit boundaries (DVSADM16O8H8W). The nature of the packed data means the data path between bits of the operand and input bits of the adders 2102 is the same for both modes. A similar carry chain control operates on the row adders 1803, 1813, 1833, 1843, 1853, 1893, 1903, 1913, 1933, 1943, 1953, 1993. Similarly the relationship between the row adder output bits and the destination bits is unchanged due to the nature of the packed data.

This invention can perform 512 8 bit or 256 16 bit absolute differences per cycle as compared to 16 8 bit or 8 16 bit absolute differences per cycle in prior art. This results in an improvement of thirty two times. Proposed art dynamically performs different block searches using mask bits in control registers. This invention may also perform two horizontal pixel line searches in a single instruction.

Figure 22:
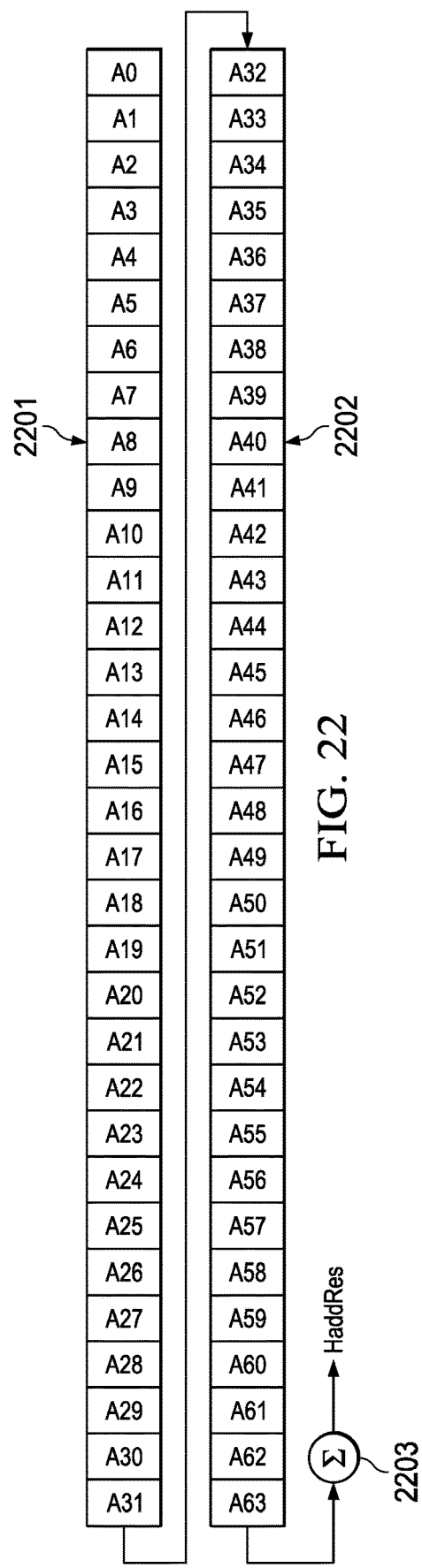
FIG. 22 illustrates the operation of a horizontal add instruction.

FIG. 22 illustrates the operation of a horizontal add instruction. The instruction preferably specifies a single input operand of 32 bits (word), 64 bits (double word), 128 bits (quad word), 256 bits (vector) or 512 bits (double vector). The instruction preferably specifies a data size of 8 bit, 16 bits, 32 bits or 64 bits. Note other operand sizes and data sizes are possible. FIG. 22 illustrates a double vector operand consisting of first vector 2201 and second vector 2203. FIG. 22 illustrates the double vector 2201/2202 divided into 64 8 bit parts. Adder 2203 forms the sum of the 64 8 bit parts generating a horizontal addition result (HaddRes).

Figure 23:
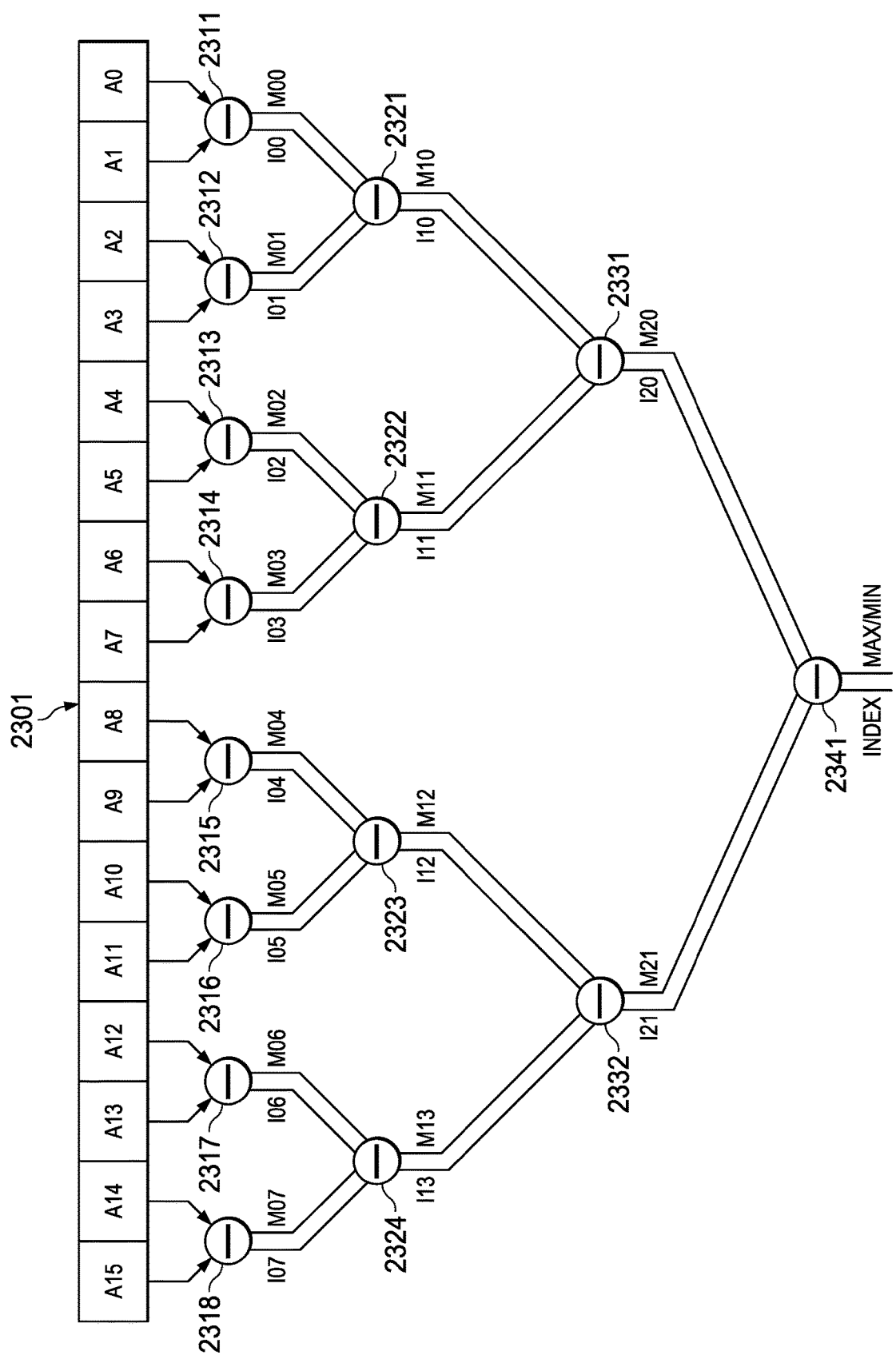
FIG. 23 illustrates the operation of a horizontal minimum or maximum with index instruction.

FIG. 23 illustrates the operation of a horizontal minimum or maximum with index instruction. The example of FIG. 23 is an operand of 128 bits (quad word) consisting of 16 8 bit data parts. The instruction preferably specified an operand size and a data size from respective permitted sets. The instruction generates an output consisting of the maximum/minimum data within the set and an index of the location of the determined maximum/minimum data element. Each of comparators 2311, 2312, 2313, 2314, 2315, 2316, 2317, 2318, 2321, 2322, 2323, 2324, 2331, 2332 and 2341 receives two data values and two index values. Each comparator determines which of the two data values is greater/smaller and outputs that data value and the corresponding index. Comparators 2311, 2312, 2313, 2314, 2315, 2316, 2317 and 2318 determine initial indices from the location within the operand. Thus comparator 2311 compares data element a0 and a1 and generates its index output based upon the location within the operand (index 0 or index 1). Comparators 2321 to 2314 receive the outputs of comparators 2311 to 2318 and similarly output a data value and an index. Comparators 2331 to 2332 receive the outputs of comparators 2321 to 2324. Lastly, comparator 2341 receives the outputs of comparators 2331 to 2332 generating the data value and the index for the whole operand.

What is claimed is:
1. A processor comprising:
a set of registers;
a set of functional units, wherein the set of functional units is operable to compare a first vector to a second vector and a third vector by:

comparing each byte of the first vector to a corresponding byte of the second vector to produce a corresponding comparison bit of a first set of comparison bits;
storing the first set of comparison bits in a first portion of the set of registers;
comparing each byte of the first vector to a corresponding byte of the third vector to produce a corresponding comparison bit of a second set of comparison bits;
storing the second set of comparison bits in a second portion of the set of registers; and
determining whether the first vector is within a range bounded by the second vector and the third vector based on the first and second sets of comparison bits stored in the set of registers.

2. The processor of claim 1, wherein the set of functional units is operable to compare the first vector to the second vector and the third vector in response to:
a first instruction that specifies the first vector, the second vector, and the first portion of the set of registers; and
a second instruction that specifies the first vector, the third vector, and the second portion of the set of registers.

3. The processor of claim 2 further comprising a set of data registers, wherein:
the first vector is stored in a first data register of the set of data registers; and
the first instruction and the second instruction specify the first vector by specifying the first data register.

4. The processor of claim 2 wherein the first vector is determined based on a value stored in a constant field of the first instruction.

5. The processor of claim 4, wherein the first vector is determined by zero extending the value stored in the constant field of the first instruction.

6. The processor of claim 4, wherein the first vector is determined by sign extending the value stored in the constant field of the first instruction.

7. The processor of claim 1, wherein the comparing of each byte of the first vector to the corresponding byte of the second vector and the comparing of each byte of the first vector to the corresponding byte of the third vector are performed by a single functional unit of the set of functional units.

8. The processor of claim 1, wherein the comparing of each byte of the first vector to the corresponding byte of the second vector and the comparing of each byte of the first vector to the corresponding byte of the third vector are performed by different functional units of the set of functional units.

9. A processor comprising:
a set of registers;
a set of functional units, wherein the set of functional units is operable to:
in response to a first instruction that specifies a first vector and a second vector and a second instruction that specifies the first vector and a third vector:
perform a byte-wise comparison of the first vector to the second vector to produce a first set of comparison bits;
store the first set of comparison bits in the set of registers;
perform a byte-wise comparison of the first vector to the third vector to produce a second set of comparison bits; and
store the second set of comparison bits in the set of registers; and determine whether the first vector is within a range bounded by the second vector and the third vector based on the first and second sets of comparison bits stored in the set of registers.

10. The processor of claim 9, wherein:
the first instruction specifies a first portion of the set of registers;
the set of functional units is operable to store the first set of comparison bits in the first portion of the set of registers in response to the first instruction;
the second instruction specifies a second portion of the set of registers; and
the set of functional units is operable to store the second set of comparison bits in the second portion of the set of registers in response to the second instruction.

11. The processor of claim 9 further comprising a set of data registers, wherein:
the first vector is stored in a first data register of the set of data registers; and
the first instruction and the second instruction specify the first vector by specifying the first data register.

12. The processor of claim 9 wherein the first vector is determined based on a value stored in a constant field of the first instruction.

13. The processor of claim 12, wherein the first vector is determined by zero extending the value stored in the constant field of the first instruction.

14. The processor of claim 12, wherein the first vector is determined by sign extending the value stored in the constant field of the first instruction.

15. The processor of claim 9, wherein the byte-wise comparison of the first vector to the second vector and the byte-wise comparison of the first vector to the third vector are performed by a single functional unit of the set of functional units.

16. The processor of claim 9, wherein the byte-wise comparison of the first vector to the second vector and the byte-wise comparison of the first vector to the third vector are performed by different functional units of the set of functional units.

17. A method comprising:
receiving, by a processor, a set of instructions that specify a first vector, a second vector, and a third vector;
comparing, by the processor, each byte of the first vector to a corresponding byte of the second vector to produce a respective comparison bit of a first set of comparison bits;
storing the first set of comparison bits in a first set of registers;
comparing, by the processor, each byte of the first vector to a corresponding byte of the third vector to produce a respective comparison bit of a second set of comparison bits;
storing the second set of comparison bits in a second set of registers; and
determining, by the processors, whether the first vector is within a range bounded by the second vector and the third vector based on the first and second sets of comparison bits stored in the set of registers.

18. The method of claim 17, wherein the set of instructions includes:
a first instruction that specifies the first vector, the second vector, and the first set of registers; and
a second instruction that specifies the first vector, the third vector, and the second set of registers.

19. The method of claim 17, wherein the set of instructions includes a constant field that includes a portion of the first vector.

20. The method of claim 19 further comprising zero extending the portion of the first vector included in the constant field.

* * * * *